United States Patent [19]

Demonte et al.

[11] Patent Number: 4,500,216
[45] Date of Patent: Feb. 19, 1985

[54] ELECTRONIC TYPEWRITER

[75] Inventors: Flippo Demonte, Borgofranco; Mario Figini, Borsco Marengo, both of Italy

[73] Assignee: Ing. C. Olivetti & C., S.p.A., Ivrea, Italy

[21] Appl. No.: 310,964

[22] Filed: Oct. 13, 1981

Related U.S. Application Data

[63] Continuation of Ser. No. 58,202, Jul. 17, 1979, abandoned.

[30] Foreign Application Priority Data

Jul. 18, 1978 [IT] Italy .................. 68695 A/78

[51] Int. Cl.³ .......................... B41J 19/64; B41J 5/30
[52] U.S. Cl. ........................................ 400/8; 400/12;
400/63; 400/64; 400/279; 400/697; 400/210
[58] Field of Search ... 364/200 MS File, 900 MS File;
400/2-8, 12, 13, 17, 63, 64, 210, 696-697.1, 68, 76, 582, 279

[56] References Cited

U.S. PATENT DOCUMENTS

| | | | |
|---|---|---|---|
| 3,447,134 | 5/1969 | Thompson et al. | 400/68 X |
| 3,558,820 | 1/1971 | Baisch et al. | 340/365 R |
| 3,674,125 | 7/1972 | Kolpek | 400/5 |
| 3,757,921 | 9/1973 | Bishop | 400/3 |
| 3,780,846 | 12/1973 | Kolpek et al. | 400/697.1 X |
| 3,812,945 | 5/1974 | Koplow et al. | 400/63 X |
| 3,915,278 | 10/1975 | Spence et al. | 400/64 |
| 3,924,723 | 12/1975 | Cooper et al. | 400/63 |
| 3,968,868 | 7/1976 | Greek et al. | 400/64 X |
| 4,051,945 | 10/1977 | Fujimoto et al. | 400/279 |
| 4,084,680 | 4/1978 | Deetz | 400/17 |
| 4,240,758 | 12/1980 | Acosta | 400/76 X |
| 4,245,918 | 1/1981 | Bowles et al. | 400/697.1 |

OTHER PUBLICATIONS

*IBM Tech. Disc. Bulletin,* by C. G. Brown, "Bold Image Typing", vol. 20, No. 9, Feb. 1978, pp. 3555-3556, 400-210.

Primary Examiner—Paul T. Sewell
Attorney, Agent, or Firm—Banner, Birch, McKie & Beckett

[57] ABSTRACT

An electronic typewriter comprises a character-bearing disk movable along the platen and a selector to space selected characters according to a plurality of constant spaces or proportional spaces. The electronic unit provides a line buffer on which the entered characters of a line are sequentially stored and a series of editing functions to have the entered characters directly printed in editing form and a permanent, alterable memory wherein are recorded positioning information for the disk and constant phrases to be printed can be recorded and recalled upon request of the operator. Justification of a line is commanded by a selector which allows the printing of entered characters up to a set zone of the printing line while stores, without printing, the remaining characters on the line buffer. Following actuation of a service key causes the delayed printing of stored part of the line aligned to the fixed right margin. An evidence selector is further operable at any point of the printing line to cause an evidence of printed character as bold-facing or underlining and a cancel key is provided to automatically cancel the already printed characters.

6 Claims, 31 Drawing Figures

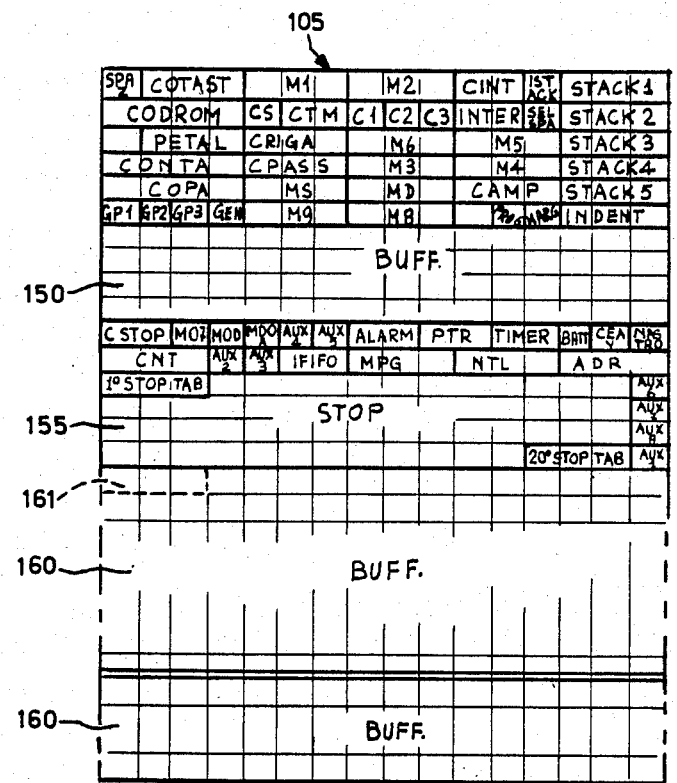
FIG.3
FIG.3A
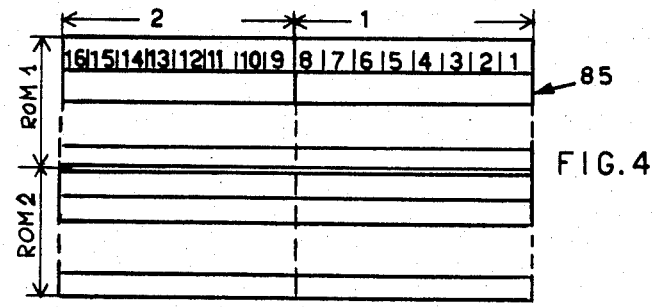
FIG.4
FIG.5

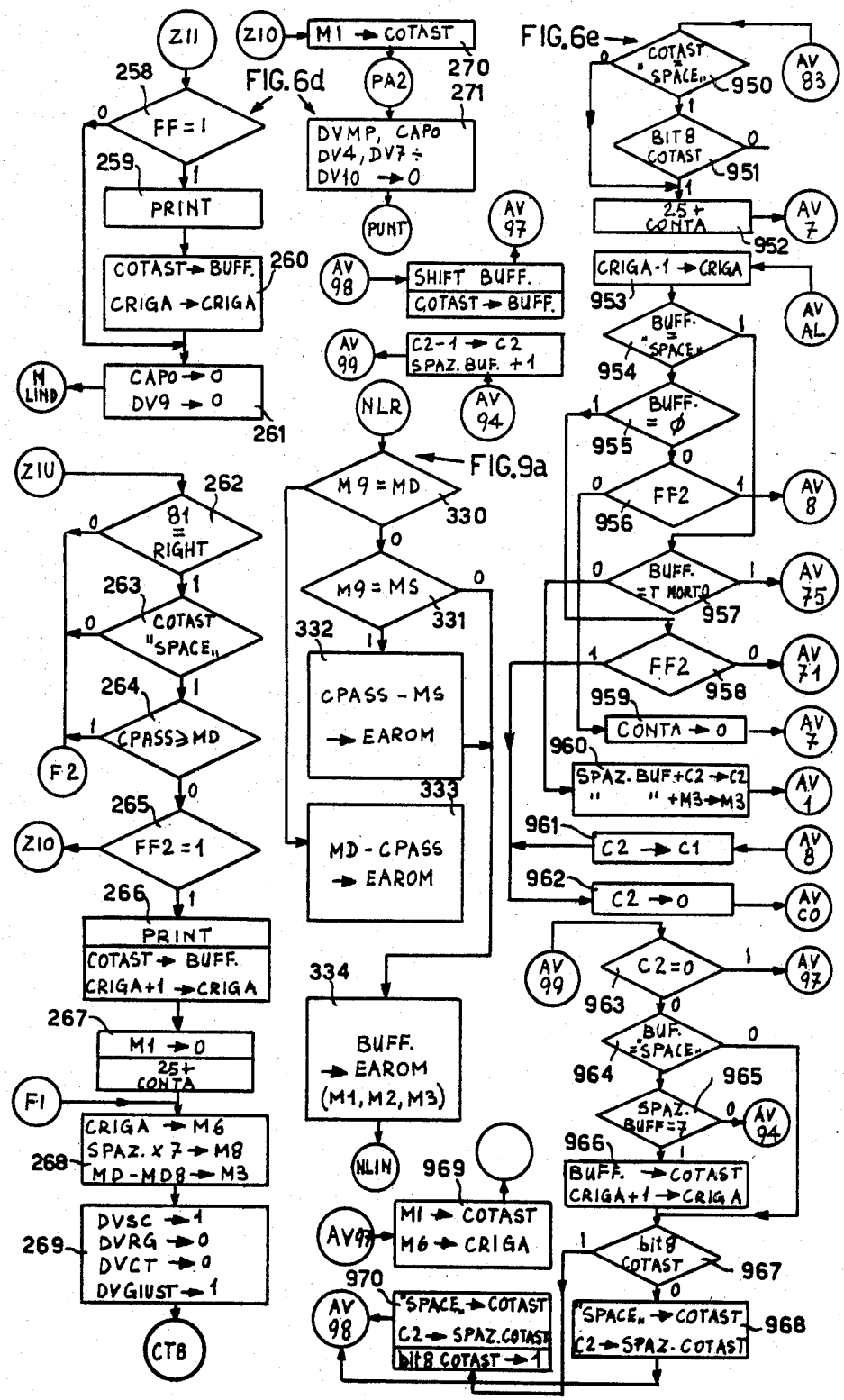

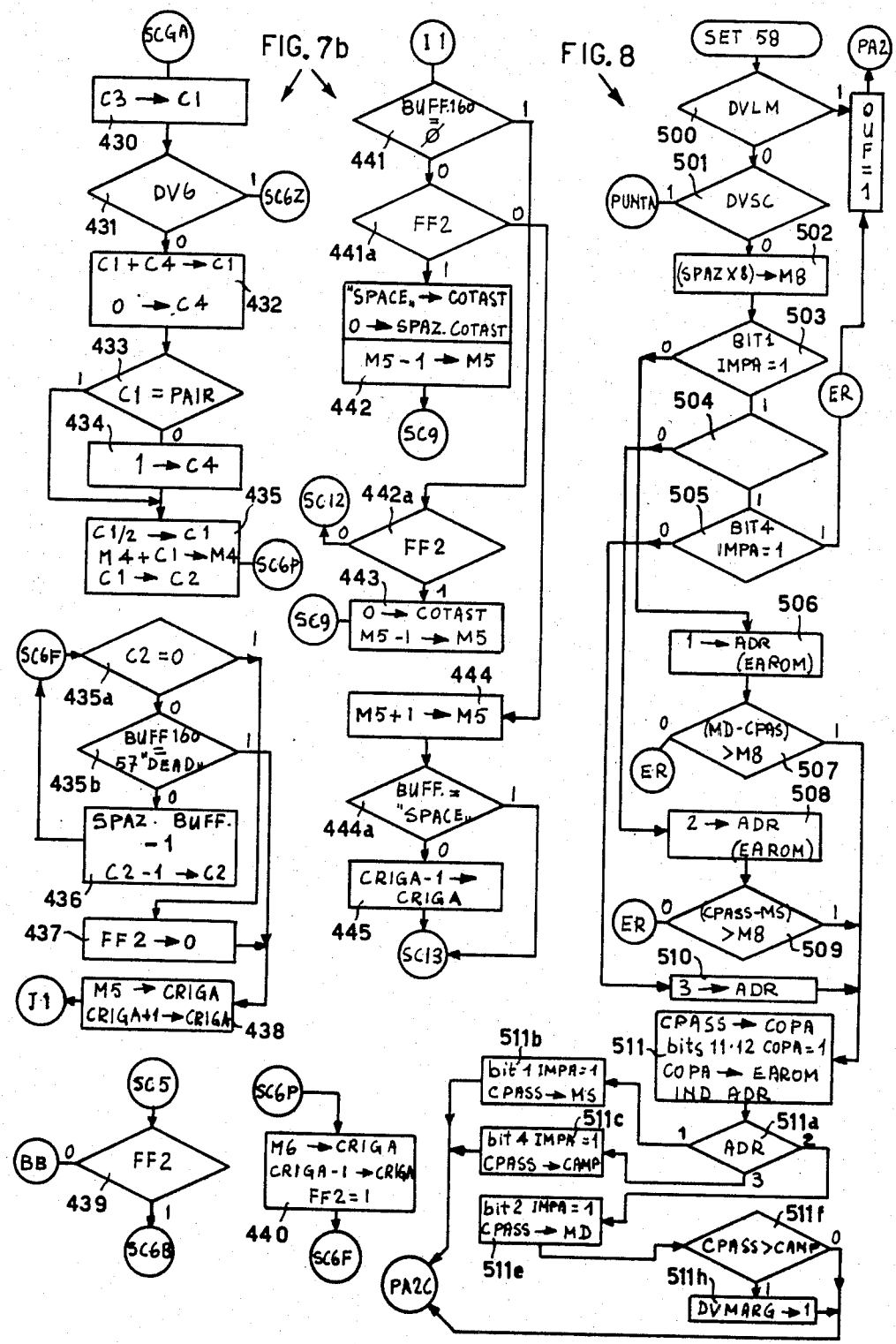

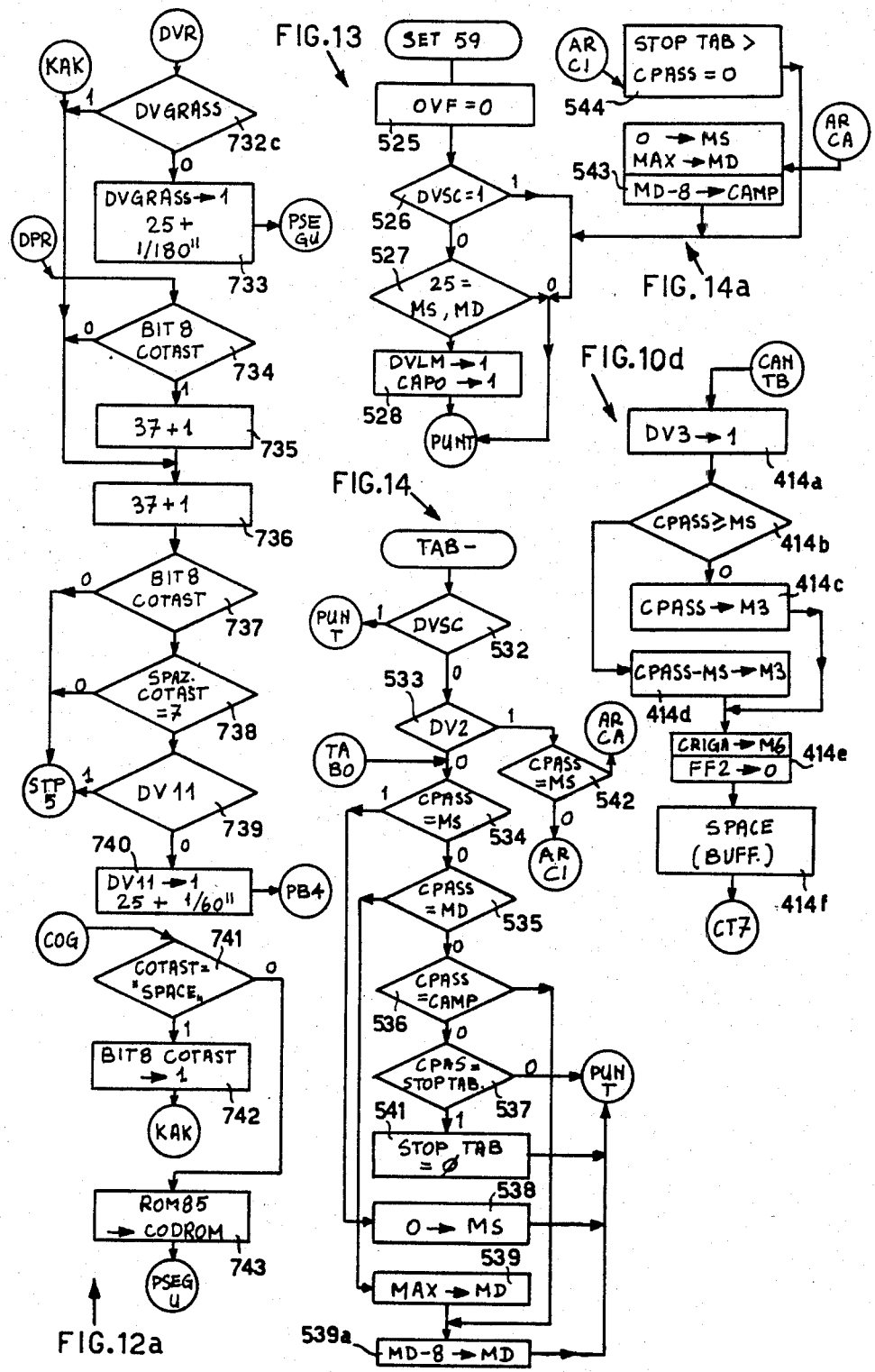

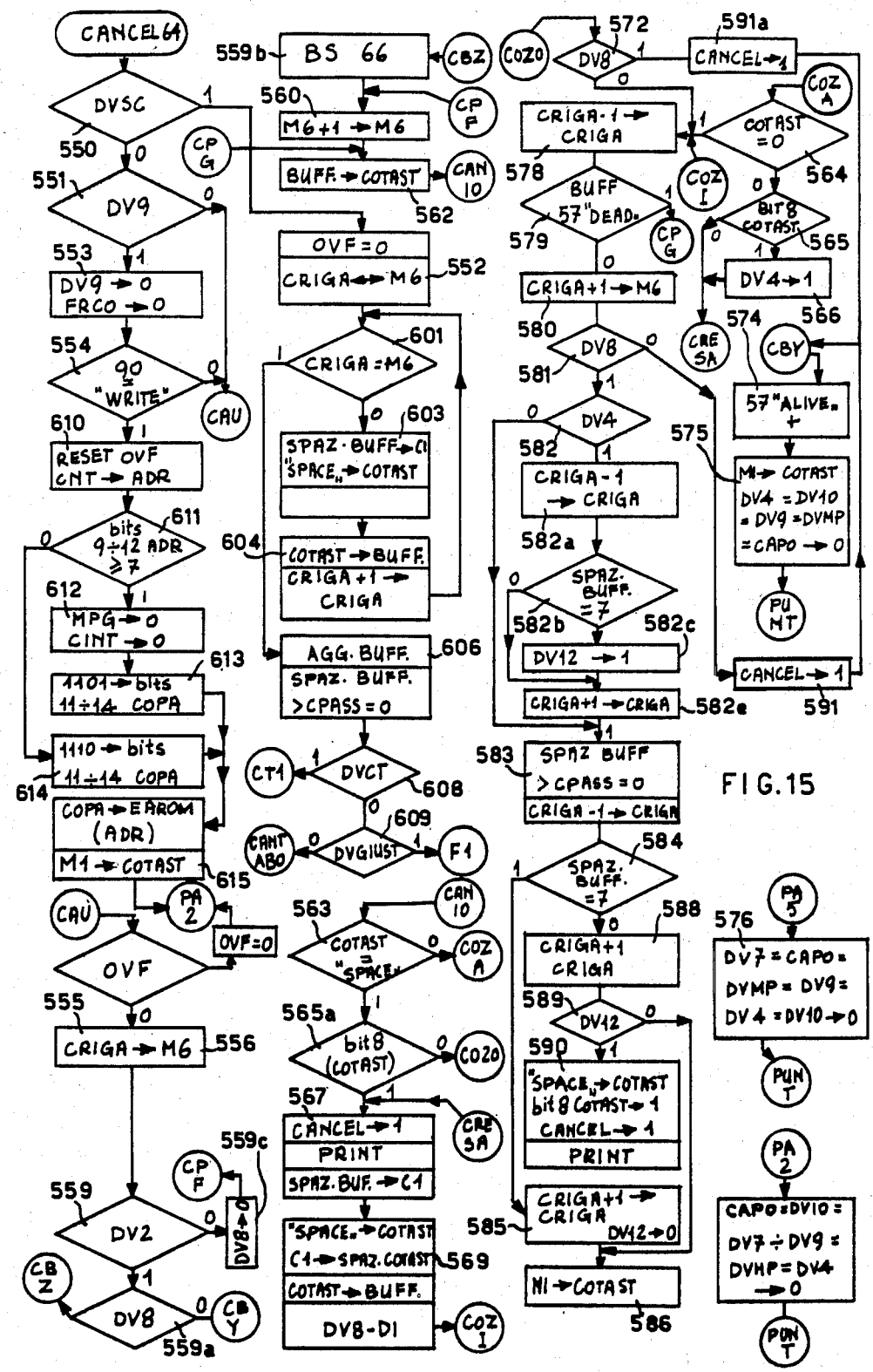

ELECTRONIC TYPEWRITER

This is a continuation of application Ser. No. 058,202, filed July 17, 1979, now abandoned.

The present invention relates to an electronic typewriter of the type in which the keyboard and the printing unit are controlled by a command unit of the digital type. More in particular the present invention relates to a typewriter of the above said type which, in addition to the normal functions available in a typewriter, has a plurality of functions for editing the line of type whilst it is being applied to the paper, which are commanded from the keyboard and carried out automatically by the machine.

Printing systems are known which store texts in file stores such as cards magnetic discs or tapes for transcription at a subsequent time with some detailed editing such as centering of title, automatic underlining or justification of the right hand margin. The same stores can furthermore be used for memorising constant phrases, memorising page layout, etc, etc. These typing systems are however sold at a price which is substantially greater than that of normal typewriters and do need trained personnel to operate them.

The aim of the present invention is consequently to provide an electronic typewriter which is provided with editing facilities for the actual line which is being printed out, which apart from this, take the form of a normal typewriter which can be operated by a non-specialised person, at a cost which is comparable to that of normal typewriters which are on the market at the present time and in which however, editing operation are difficult to carry out and can only be done in a purely manual manner or at the most semi-automatically.

In order to achieve this aim, the present invention provides and electronic typewriter with a keyboard, a unit for serial print, a digital governing and control unit for the keyboard operations and for the print unit which, in accordance with a first characteristic of the machine, is provided with a non-volatile store for permanent and operator-alterable storage of information for positioning the printing unit and selective storage of constant alphanumeric information, which is introduced from the keyboard and by means provided on the keyboard for recalling this for the command of the said unit.

According to a further characteristic, the machine includes a justification selector which provides for typing of a predetermined region of a line and prearranges storage without print of the remaining portion of the line in order to carry out justification of the right hand side, a control unit which provides for complete printing of the last word even in the case when a part of it extends beyond the predetermined region and activates the storage without print only after a space has been inserted adjacent to the last word and an actuating unit for justified printing of the line stored without print.

According to a third characteristic, the machine includes means on the keyboard which prearrange for storage without print of data typed in, a control unit which sets out this data typed in symmetrically with respect to a predetermined point of the line and an actuating unit which prints the stored data in such a way that it is centered with respect to the said point.

According to a fourth characteristic, the print unit is adapted to print with differing degrees of spacing and the keyboard, which is provided with a spacing selector, modifies this spacing and provides for storage and print of the data digitized in accordance with the spacing selected, at any point in the line whatsoever, without altering the spacing of the parts which have already been stored.

According to a fifth characteristic, the keyboard is provided with a selector for causing parts of the texts to stand out which modifies the storage and the printing of each piece of data typed in by means of the addition of an underlining stroke and/or by means of the reprinting of the same piece of data repeated to give an appearance of heavy print, without modifying the other editing functions of the machine. According to a further characteristic, the machine is provided with a device for deleting data already typed from the sheet using reprinting in a deleting mode of the data typed, by means which recall the data typed and stored from the store in order for it to be reprinted in a deleting mode, by means which cancel from the store the data deleted from the typed sheet, leaving in the place of the data a spacing code having the same spacing as that of the deleted data.

These and other characteristics of the present invention will become clear from the description which follows which is given by way of non-limiting example with reference to the attached drawings FIG. 1 is a diagrammatical plan view of the typewriter according to the invention;

FIG. 3 shows the layout of the organisation of a store of the unit shown in FIG. 2;

FIG. 3A shows the layout of the organisation of one cell of the store shown in FIG. 3;

FIG. 4 shows the layout of the organisation of a further store of the unit shown in FIG. 2;

FIG. 5 shows the layout of the organisation of one cell of a further store of the unit shown in FIG. 2;

FIGS. 6, 6a, 6b, 6c, 6d and 6e is a flow chart of the program of the initialization of the machine, of the key recognition, of the processing for the alphanumeric keys and for a jump to the various programs for governing the service keys. In particular FIGS. 6C and 6E relate to the governing to the alphanumeric keys in a region of a line which has already been written;

FIGS. 7, 7a, 7b is a flow chart of the program for governing the buffer for a line when blind printing is occuring;

FIG. 8 is a flow chart of the program for operating the service key for setting out margins;

Figure 9:
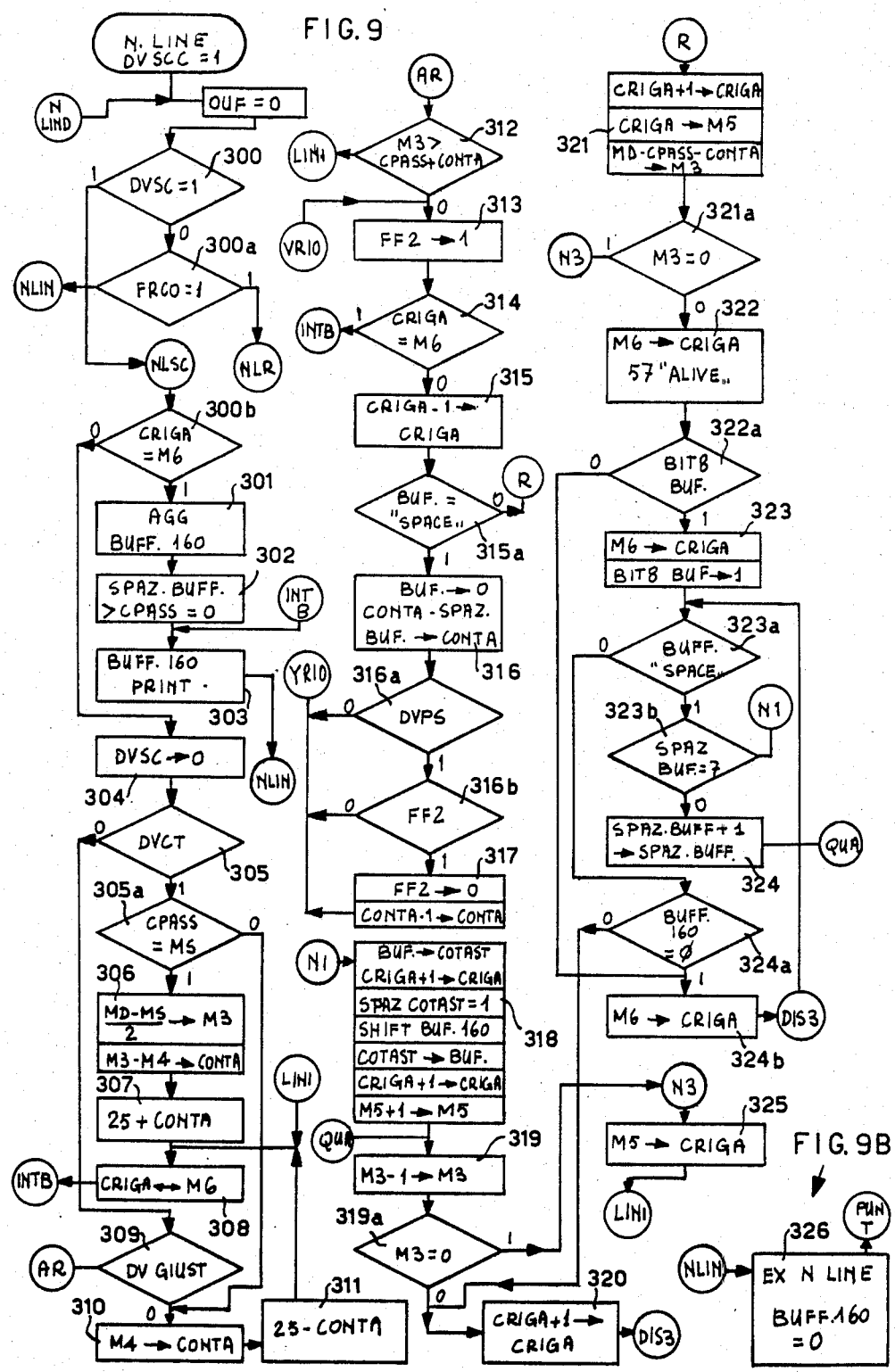

FIGS. 9, 9a and 9b show a flow chart of the program for governing the service key for return to the start of a line with line space (NEW LINE); in particular FIG. 9 relates to the governing of the NEW LINE key under blind writing conditions, FIG. 9A relates to the governing of the NEW LINE key when constant phrases are being recorded and FIG. 9B relates to the governing of the NEW LINE key under normal conditions.

Figure 10:
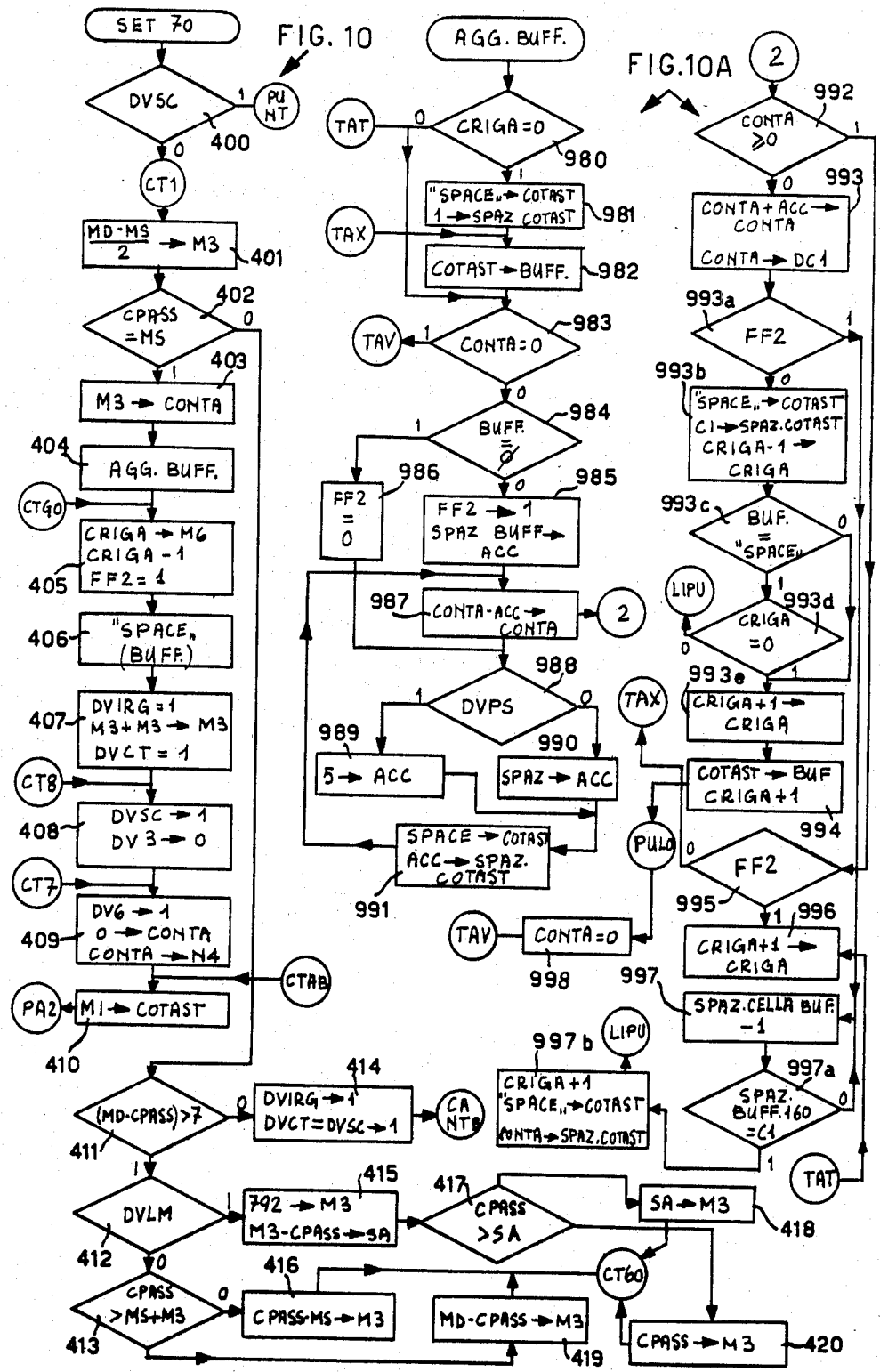
Figure 11:
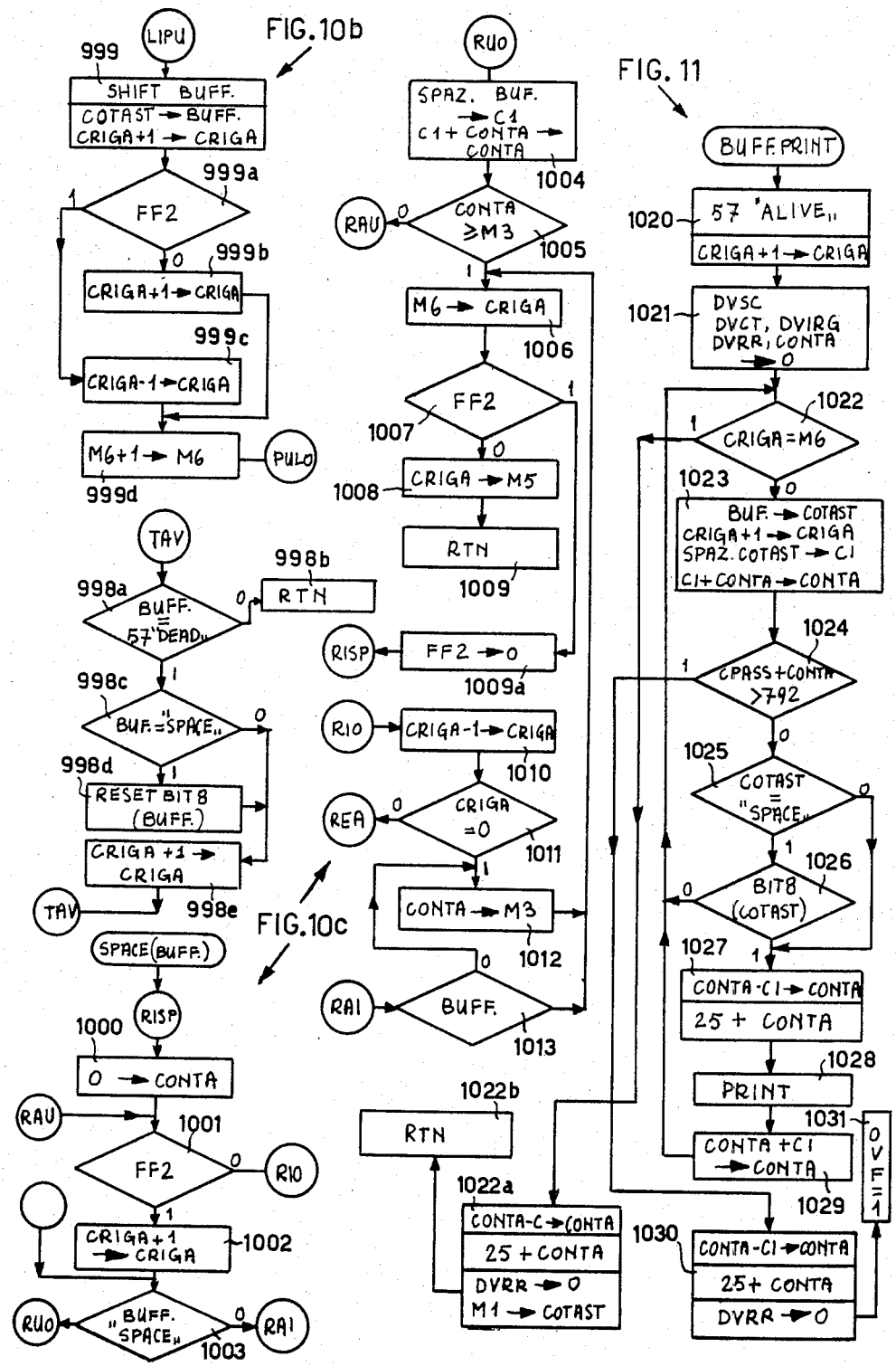
Figure 12:
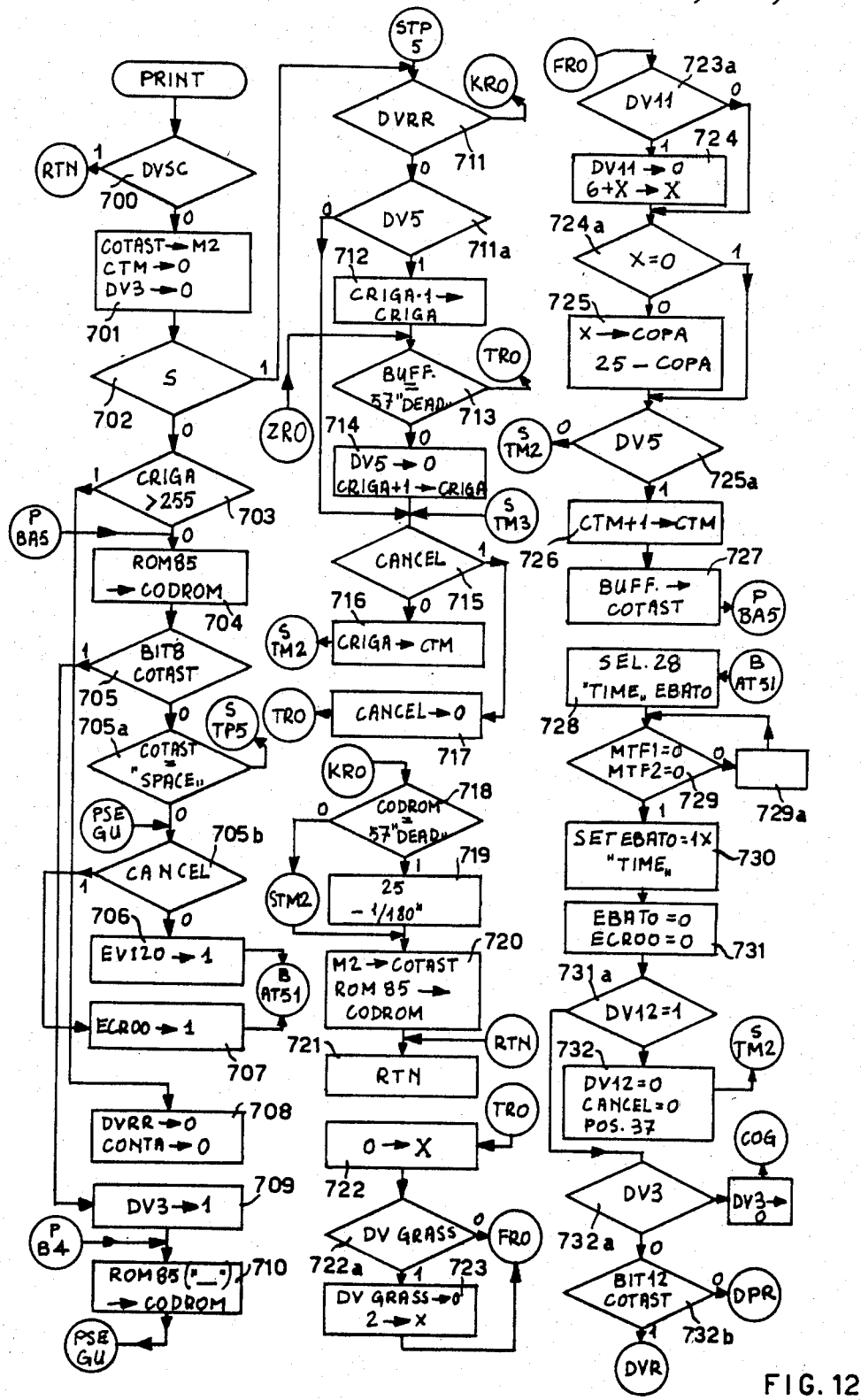
Figure 16:
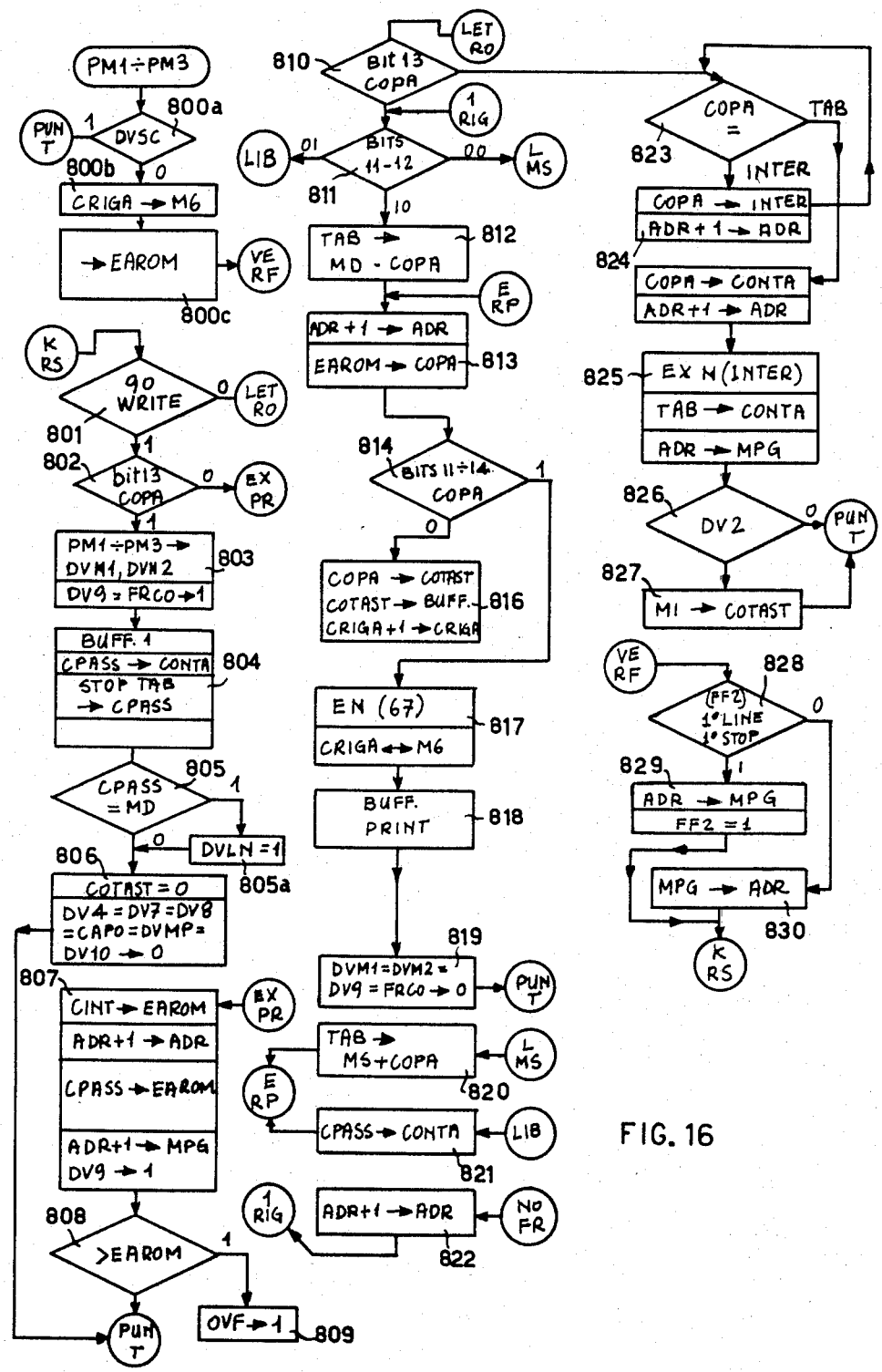

FIGS. 10 and 10A show a flow chart of the program for governing the service key for centering titles;

FIGS. 10, 10b and 10c show a flow chart of a sub-routine for "adjust line buffer";

FIG. 10d shows a flow chart of a sub-routine for "search out spaces in the line buffer";

FIG. 11 shows a flow chart of a sub-routine for "print out characters held in line buffer";

FIGS. 12 and 12a show a flow chart of a sub-routine for "print character digitized";

FIG. 13 shows a flow chart of the program for governing the service key "margin release";

FIGS. 14 and 14a shows a flow chart of the program for governing the TAB— service key;

FIG. 15 shows a flow chart of the program for governing the deleting key (CANCEL);

FIG. 16 shows a flow chart of the program for governing the keys for selecting EAROM store.

GENERAL DESCRIPTION OF THE TYPEWRITER

Figure 1:
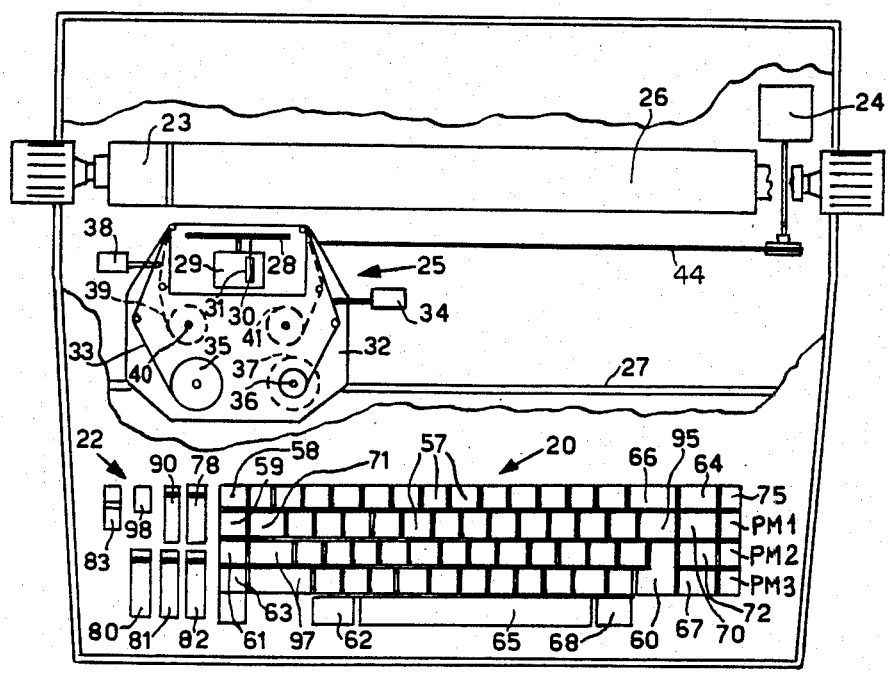

With reference to FIG. 1 the typewriter according to the invention comprises; an alphanumeric keyboard 20, a command console 22, a platen 26 which is advanced incrementally by a line spacing device 23 of the type described in U.S. patent application Ser. No. 920,060, filed on June 28, 1978, and assigned to Ing. C. Olivetti and C., S.p.A., a serial print unit 25 of a known type, which is advanced incrementally, parallel to the platen 26, by a transport motor 24 operating via belt 44 and guides 27. The print unit comprises: a character-bearing part 28 of the "daisywheel" type, which is rotated incrementally by a motor 29 for selecting the "petal" carrying the symbol to be printed; a striking hammer 30 which is operated by a solenoid 31, which is energised for a period of time which varies depending on the symbol which is to be printed, as described in U.S. patent application Ser. No. 055,782, filed on Sept. 7, 1979, and assigned to Ing. C. Olivetti and C., S.p.A.; a cartridge 32 carrying typing ribbon 33 which is interposed between the character-bearing element 28 and platen 26, which is raised in the print mode by an electromagnet 34 and is advanced after one print operation passing between spools 35 and 36 by means of rotating electromagnet 37; and a correcting ribbon 39 which is raised for carrying out correction by an electromagnet 38 and automatically advanced during the raising operation passing between spools 40 and 41.

The typewriter 49 further includes a control and governing unit 50 and, in accordance with one aspect of the present invention a non-volatile store 51 (EAROM of a known type) which is operatively subdivided into three regions for permanent operator-alterable storage of margin tabulator stops, page layout and selectively for constant phrases, as will be described in more detail below.

KEYBOARD AND COMMAND CONSOLE

With reference to FIG. 1, keyboard 20, in addition to the normal alphanumeric keys 57, further includes the following service keys: setting up and storage of margins 58, margins release 59, prearranged indent 75, cancel out tabulator stop (TAB—) 61, set up tabulator stops (TAB+) 63, centre titles 70, numerical tabulation 95, alphabetical tabulation 71, upper case/lower case 97, repeat (REPEAT) 62, space 65, half space back space 68, return to start with new line 60 (NEW LINE), return to start without new line, back space by one character (BACK SPACE) 66, line space (INDEX) 67, delete 64, selection of 1st, 2nd, 3rd part of EAROM store PM1, PM2 and PM3 respectively. The functions carried out as a result of operation of these keys will be described in detail below.

The typewriter is designed to have differing configurations of the keyboard, and one main feature of this is a selection arrangement using a selector 90 of the command console 22; each alphanumeric key 57 consequently represents two differing symbols, one for each configuration, and both of which can be indicated on the actual heads of the keys 57. The information concerning the symbol represented by each key in each configuration is memorised by a ROM store 85 for keyboard specialisation (FIG. 2), which is addressed by codes generated by the digitizing of the keys and by a conditioning code depending on the position of the selector 90.

Command console 22 comprises:

a spacing selector 82 for selecting the writing interval, having four postions corresponding to spacings of 1/10" (2.5 mm), 1/12" (2.1 mm), 1/15" (1.7 mm) and proportional (PS); with proportional spacing the spacing associated with the character can take on the following values 4/60", 5/60", 6/60" and 7/60" (0.4 mm×4, ×5, ×6, ×7) depending on the width of the associated symbol; the information for spacing unit PS is stored for each symbol in the ROM 85 and each type of spacing corresponding to the use of a particular character-bearing element;

a line spacing selector 80 which is adapted to select five differing types of line spacing which are defined as the number of single advancing steps of the line spacing device 23 necessary to provide each type of spacing;

a right hand margin selector 81 which is able to select one of the three following modes;

NORM.—the machine operates as a normal typewriter;

RIGHT—the machine carries out justification of the line of print at the right hand margin by means of digitizing of a part of the line when printing blind;

ADJUST—the machine carries out an automatic return to the left hand margin inserting a space or a hyphen at a predetermined point and adjacent to the right hand margin;

the program selector 90 which is designed to select one of the three following modes;

NORM—the machine operates as a normal typewriter;

WRITE—sets up the machine for recording constant phrases or page layout in the non-volatile store 51

KBII—selects the second keyboard configuration.

an underlined/heavy print selector 78 which is designed to select one of the four following modes;

NORM—the machine functions as a normal typewriter;

UNDERLINE—automatically underlines each character digitized and printed;

HEAVY PRINT—in accordance with the invention the typewriter prints each digitized character in heavy print using repetition of the printing after the print unit (head) 25 has advanced by an amount of 1/180" (0.14 mm).

UNDERLINE/—the machine carries out both the UNDERLINE and

HEAVY PRINT HEAVY PRINT MODES.

an ON-OFF switch 83 for switching the machine on and off.

a warning light (LED) 98 which is designed to provide a signal when permanently lit that key 83 is ON and when it is flashing, that the operator has made a mistake in the digitizing and/or selecting procedure.

CONTROL AND GOVERNING UNIT 50

Figure 2:
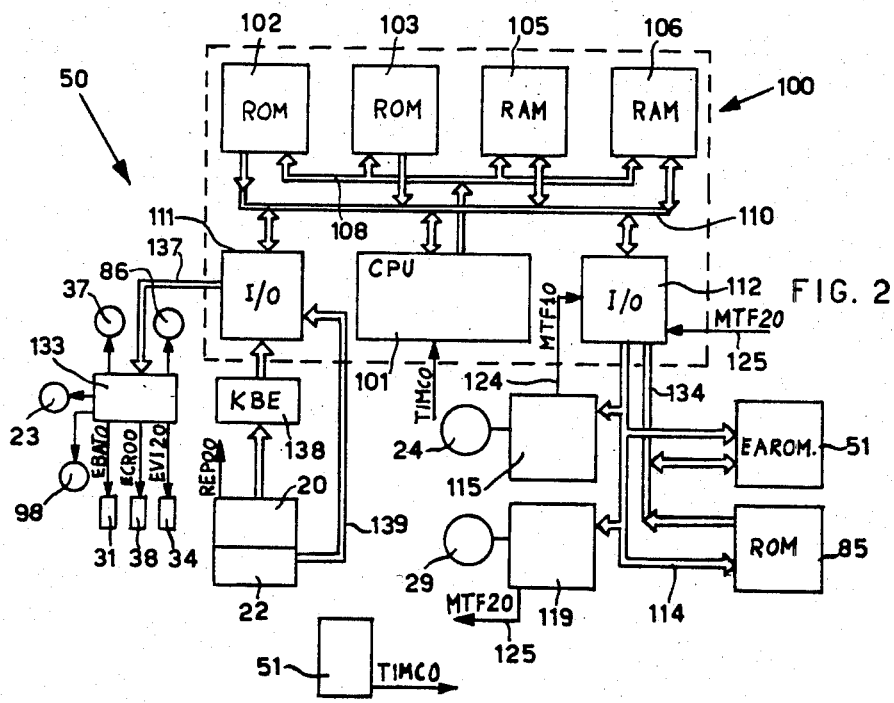
FIG. 2 is a block diagram representing the logic design of the unit for control and supervision of the typewriter shown in FIG. 1.

With reference to FIG. 2, the control and governing unit 50 comprises;

a microprocessor 100, of a known type, for example of the type described in the U.S. Pat. No. 4,114,026, assigned to Ing. C. Olivetti and C., S.p.A. or of the type PPSA/2, manufactured by Rockwell International Corp., and the reader should refer to the instruction manual for this for details of its organisation and the range of micro-instructions on the basis of which it operates; the microprocessor 100 includes: a central unit (CPU) 101; two stores ROM 102 and 103 for permanent storage of the sequence of micro-instructions which are necessary for operation of the machine (microprograms), the flow charts of which will be described below; two working or operative stores RAM 105 and 106 used for temporary storage of data during operation of the machine, and the organisation of this will be described below; stores 102, 103, 105, and 106 are connected to CPU 101 by an address bus 108 and a data exchange bus 110; two input/ouput units (I/O) 111 and 112 for the exchange of data and commands with the other logic units listed below.

a controlling and monitoring unit 115 for the transport motor for the carriage of the daisywheel printer 25, which for example is of the type described in our British Patent Specification No. 1 316 621, which receives from the CPU 101 via bus 114 the information relating to the position which should be reached by the carriage via I/O unit 112 and which delivers a signal MTFIO having a logic level 1 to the CPU 101 via lead 124, when this positioning has occurred.

a control and monitoring unit 119 for the motor 29 for selecting the petals of the daisywheel of known type, which receives the positioning code for the symbol to be selected taken from ROM 85. from the CPU 101 via unit I/O 112 and bus 114, and which delivers a signal MFT 20 having a logic level 1 indicating that selection has occurred, to CPU 101 via lead 125.

The ROM 85 for keyboard specialization which is designed to contain informaion relating to the position of each symbol on the daisywheel as a function of the code generated in keyboard 20 from the digitized key and as a function of the position of the selector for the keyboard configuration 90 as described above. ROM 85, receives address information from unit I/O 112 on bus 114 and sends the information for the position on bus 134 to unit I 112.

The non-volatile store 51 may be of the EAROM-NCR 3400 type manufactured by the National Cash Register Co., or, alternatively, any other store which has been rendered non-volatile. Store 51 is designed to store in a permanent and operator-alterable manner tabulating information, line spacing information, margin setting information and constant phrases, and is addressed by the CPU 101 by means of unit I/O 112 and bus 114, and exchanges data with unit I/O 112 on bus 134.

the actuating circuits 133 which are designed to receive, via bus 137 from the unit I/O 111, the command instructions for the various electromagnets 31 (EBATO) for print striking, 38 (ECROO) for ribbon raise, 34 (EV120) for the correcting ribbon described above, for the line spacing device 23, for the bell or buzzer 98, which indicate that the region of the right hand margin is being reached, for warning lamp LED 86 and for the rotating (ribbon feed) electromagnet 37, and to provide energising of all these.

a timing unit 52 which generates a clock signal TIMCO for synchronizing the various operations of the control unit in the input-output sense.

the keyboard 20, connected to a keyboard encoder (KBE) 138, which sends the digital codes from the keys to unit I/O 111. The REPEAT key 62 and all the keys 57 which are repeaters when additionally depressed send a signal REPOO=1 from the keyboard 20 to unit I/O 111 each time the repeat function is thus commanded.

the command console 22, which sends information relating to the selectors 80, 81, 82, 83, 90 and 78 to I/O unit 111 via bus 139.

ORGANISATION OF THE KEYBOARD SPECIALISATION ROM 85

The keyboard specialisation ROM 85 (FIG. 4) stores the information relating to the 96 alphanumeric symbols printed by the machine for two separate keyboard configurations which can be selected by means of selector 90; it consequently stores, in all, 192 alphanumeric symbols; each symbol occupies 16 bits (2 bytes) in which the following information is stored:

| | | |
|---|---|---|
| 1st BYTE | bits 1-7 | position of symbol on daisywheel |
| 1st BYTE | bits 8 | the symbol is underlined; |
| 2nd BYTE | bits 1-2 | intensity of strike with which the symbol is to be printed |
| 2nd BYTE | bit 3 | the symbol is hyphen (-) |
| 2nd BYTE | bit 4 | the symbol is dead key |
| 2nd BYTE | bits 5-7 | code indicating the degree of spacing associated with the symbol |
| 2nd BYTE | bit 8 | code indicating that the symbol is one of the following; comma, decimal point, close brackets. |

ORGANISATION OF NON-VOLATILE STORE 51

The following information can be stored in the non-volatile store;

| | |
|---|---|
| left hand margin | |
| right hand margin | |
| position preceding right hand margin indicated by a ring of the bell (or the buzzer) | |
| 20 tabulation stops | |
| 1st store (52 positions) | For constant |
| 2nd store (90 positions) | Phrases and page |
| 3rd store (90 positions) | layout |

Each piece of information in the store is stored using 16 bits. As the store is organised in 1024 words of 4 bits, 4 bytes are necessary for each piece of information (FIG. 5) in which bits 15 and 16 are used for control coding.

The organisation of one cell of non-volatile store 51 is shown in FIG. 5.

For storing the margins and the bell position, the position of each margin is stored using the first 10 bits of the code.

Bits 11 and 12, at "1", indicate that the margin or the bell position has been stored by the operator. When they are at zero they indicate that the margin or the bell has been automatically fixed by the machine.

For storage of the tabulation stops, the position of each stop is stored using the first 10 bits of the code. The bit 11 indicates stop with print of a vertical columning. Bit 12 indicates stop with print of a vertical columning in heavy print.

For the storage of constant phrases and page layout the information corresponding to the constant phrase and to the page layout are stored in the following manners, identified by bits 11–14 written in the order given at the side of each case;

(a) bit 14 indicates, when it is a "0", that the store is specialised for a constant phrase, when it is at "1" that the store is specialised for the page layout.

(b) character of the constant phrase; XXOO

The stored code is the one which is held in the line buffer and occupies the first 12 bits of the code. The characters which make up a constant phrase are preceeded by a prearranged coding which indicates if the phrase is referred to the left hand margin, set up in a column at the right hand side or free.

The phrase ends with a subsequent pre-arranging code, in the case of a phrase which occupies several lines, or with a code indicating the end of the phrase.

(c) constant phrase referred to the left hand margin; 0010 normally precedes the characters of the constant phrase and in the first 10 bits of this code the distance between the left hand margin and the point at which print starts is stored, in sixtieths of an inch.

During printing of a constant phrase, each time that the program encounters one of these codes it carries out the line spacing operations indicated by the line spacing selector. This code may be stored several times in order to carry out a large jump in the paper.

(d) constant phrase aligned with the right hand margin; 1010 normally precedes the characters of the phrase and in the first 10 bits of the code, the distance between the right hand margin and the point at which print starts is indicated in sixtieths of an inch. For the remainder it carries out the functions indicated under (c).

(e) free phrase; 0100

The first 10 bits of this code are not used; for the remainder it carries out the function indicated under (c).

(f) end of constant phrase: 1110

The first 10 bits of this code are not used. It indicates to the machine that the whole of the phrase contained in the store selected has been printed. If it is in the first position it indicates that the store is reset and is ready for the constant phrase.

(g) code for tabulation in page layout: 0001

In the first 10 bits, the position of the stop for the page layout is indicated.

Corresponding to each imposition of the key concerned only one of these codes is taken from the store.

(h) line space code for page layout: 1001

In the first 8 bits, the commands which have to be sent to the line spacing device are stored. Bits 9 and 10 are not used.

When one of these codes have been selected the machine automatically extracts the following code from the store which is always a tabulating code.

(i) end of page layout: 1101

The first 10 bits of this code are not used. It indicates that the carrying out of the page layout is completed. If it is in the first position it indicates that the store is reset and ready for storing the page layout.

ORGANISATION OF THE STORES RAM 105 AND 106

Each one of the two RAMs is made up by 512 storage cells of 4 bits.

FIG. 3 shows the distribution of the RAMs (each small square is a cell of 4 bits) for the storage of the data necessary for supervising the typewriter, this data being indicated by the references which can be found in the flow chart in FIGS. 6 to 15 as well and which signify the following:

CODROM—store having 16 bits which receives the information read from the ROM 85 for keyboard specialisation 85. The bits have the significance described with reference to the organisation of the said ROM with reference to FIG. 4.

PETAL—store having 12 bits, which stores the position of the daisywheel which is located in front of the hammer shaft. It has the purpose of calculating the movements of the daisywheel with respect to a new character which is to be printed.

CINT—store having 8 bits, which stores the number of commands which are sent to the line spacing device. It operates in the compilation of the page layout.

INTER—store having 8 bits, in which the number of commands for causing the line spacing device to operate are loaded. It is furthermore used for determining the duration of energisation of the striking ELM on the basis of the code for intensity of the character and also on the basis of the position of the selectors.

CRIGA—Directs into buffer 160 the code of the last introduced and/or printed character.

M5, M6—Auxiliary store of CRIGA and indexes of buffer 160 for the loadings when writing blind.

CPASS—Counter for the print head steps. It holds, expressed in sixtieths of an inch, the distance of the head with respect to the physical zero of the machine (extreme left hand margin).

M3, M4—Auxiliary store for CPASS.

CONTA—Store having 16 bits mainly used for calculation of the print head displacements.

COPA—Store having 16 bits used as:
(a) store from which the data is taken for conversation with control units 115 and 116 of motors 118 and 119
(b) store from which the data are taken which is to be written into EAROM
(c) buffer store in which the data for reading EAROM is deposited
(d) store in which the signals are generated for sampling the selectors of the console and the intensity of strike.

MS—Stores the position of the left hand margin expressed in sixtieths of an inch with respect to the physical zero of the machine. It is copied out again in EAROM.

MD—The same as for MS, but for the right hand margin.

CAMP—The same as for MS, but for the bell situation

INDENT—The same as for MS, but for the indent position. Not duplicated in EAROM.

| | |
|---|---|
| M 8<br>M 9<br>C 1<br>C 2<br>C 3<br>C 4<br>C 5<br>CP 1<br>GP 2<br>GP 3 | Stores having 12 bits for general use. |

NASTRO, (RIBBON)—Command counter for the ribbon advance mechanism.

IFIFO—Counter for governing the keyboard buffer.

KEYBOARD BUFFER 150—Able to hold 32 impositions from the keyboard: organised with a FIFO (FIRST-IN-FIRST-OUT) structure. When it is full the input of data from the keyboard is blocked, the buffer is emptied and carries out normally the function corresponding to the stored code and then the error signal is given.

TABULATING STOP 155—Is able to hold 20 tabulating stops, each one of which is stored on 10 bits. The value is expressed in sixieths of an inch and represents the distance of the STOP from the physical zero of the machine (extreme left hand margin). The various points of stop are always stored in increasing order, even using shift when necessary.

The stops present in the store are also duplicated in EAROM, as described.

LINE BUFFER 160—Is able to store 256 character positions. In it all the symbols printed by the machine in the line of type which is in the course of processing are stored. Each character position is made up by 12 bits (3 cells in store RAM). The bits of the position have the following significance (FIG. 3A): bits 1–7 determine the address in the ROM 85 for keyboard specialisation in which all the information relating to the character printed is stored.

Bit 8 at 1 indicates that the character has been printed with underlining.

Bits 9–11 indicate, in sixtieths of an inch, the spacing to be performed by the printing head, after having printed, in order to bring itself to the new position for print.

Bit 12 at 1 indicates that the character was printed in heavy print.

COTAST—Store having 12 bits which holds the information concerning the character to be printed or already printed, which will be subsequently memorised in the buffer; the significance of the bits is the same as a position in the line buffer described above.

M1 and M2—Are auxiliary stores for COTAST

PROG—Stores the code of the program selector.

SELSPA—Stores the code of the spacing selector.

MARG—Stores the code of the margin setting selector.

IMPMA—The bits of this cell are used for storing the impositions of the margins and of the bell.

ISTACK AND STACK 1-5.—Store used by the print head for the subroutines and for determination of the address for indent.

MO7, MOD, MDOA—Temporary store for input-output signals.

CSTOP—Holds the address for governing the tabulating stops.

CNT—Auxiliary store for CSTOP and ADR.

MPG—Holds the address of EAROM in the storage of the page layout.

MTL—Stores the address in EAROM in carrying out the page layout.

ADR—Governs the addresses for read-write in EAROM.

ALARM—Counter for the duration of the acoustic signal. It is incremented at each loading edge from T1MCO.

TIMER—Counter for timing the energising of electromagnets, etc. controlled by the actuator 133 (FIG. 2)

PTR—Counter for reset of electromagnet 34 for making the typed line visible.

CEAV—Counter for energising electromagnet 37 for ribbon advance.

BATT—Counter for phasing operations with respect to the start of energisation of the strking electromagnet.

SPAZ—Contains the length of travel in sixtieths of an inch to be carried out after each print in accordance with the selector.

AUX 1-8—Cells, the bits of which are used as jump bits and status buts the significance of which is as follows:

DV1—indicates that an error has been detected because more than one key on the keyboard has been pressed at the same time or that the capacity of the keyboard buffer has been exceeded. Under these conditions the keyboard is de-activated in the sense that all instructions from it are ignored, everything stored in the buffer is carried out normally and when the buffer is empty the acoustic error signal is given and the LED is caused to light up.

DV2—Indicates that the REPEAT key has been accepted. The REPEAT key is only accepted when the keyboard buffer is empty, and after a return of 30-35 millisec in order to prevent bounce, or the signal appearing before the key code (in keys having an extra length of travel for REPEAT).

DV3—Jump for general use, used in various flows for remembering events and consequently establishing branching of the flows.

DV4—Indicates that the last key digitized was an INDEX and not a NEW LINE. It has the purpose of preventing resetting of the line buffer each time, since this is a somewhat slow operation, which could slow down the carrying out of the line spacing cycles when the above said keys are actuated for REPEAT.

OVF—Indicates any error whatsoever in the machine. It has the purpose of enabling flashing of the LED and signaling by means of the acoustic signal the digitizing of those keys which are not accepted when the machine is in this condition.

DV5—Indicates that a dead key has been imposed. This is done because the key is only stored in the line buffer and consequently has to be taken from there and printed using a live key or a service key.

DVPS—Bit which indicates that the machine is operating under proportional conditions. This is done because the console selector is not always "felt" REPEAT, writing blind) and consequently the last valid sampling is stored.

DV7—Indicates cancelling of one tabulating stop, used for governing REPEAT with key TAB- DV8—Stores the carried out correction of one character and governs the REPEAT of key CANCEL.

CANCEL—Indicates that the character should be struck with the correcting ribbon raised.

DVGRASS—Indicates forward displacement of the print head of 1/180 of an inch (HEAVY PRINT)

DVSC—Machine operating under blind writing conditions.

DVGIUST—Machine operating in blind writing conditions due to the effect of the right hand margin.

DVCT—Machine operating under blind writing condition for centering of titles.

DVIRG—Used under blind writing conditions for disabling the controls for the right hand margin.

DVMARG—Indicates that the print head has passed beyond the BELL stop.

SOTT—Indicates the code for the underline key. It has the purpose of distinguishing it from the SPACE code because underlining is treated as a code for "underlined SPACE".

DVLM—Indicates that the print head is outside the fixed margins.

DVRR—Print of characters taken from the line buffer.

DV9—Stores the fact that a Store or Program key has been operated.

FRCO—Stores the fact that a Store key has been operated.

DVM1-DVM2—Used for governing the keys PM1, PM2, PM3 and for defining the respective storage areas in EAROM.

DVMP—Stores the fact that the ½ space key has been operated. Has the purpose of blocking calculation of the spacing.

INDE—Stores enabling of the INDENT SET key

CAPO—Stores imposing of MARGIN RELEASE key for governing automatic indent.

DV10—Used for initializing page layout in the governing of the PROGRAM key.

DV6—Indicates that the 1st key in blind writing conditions has been operated. It has the purpose of calculating alignment at the right hand side.

DV11—Stores an advance of 1/60 of an inch of the print head for characters which are underlined and which belong to the 7/60" spacing group. It has the purpose of striking the underlining twice.

DV12—Indicates the print of an underlined character.

The storage of any one of the facilities whatsoever is indicated by value 1 of the corresponding switch.

In the flow charts a yes or true output has been indicated with "1" and a no or untrue output by "0".

SETTING UP OF THE INITIAL STATE OF THE MACHINE UPON SWITCHING ON

Upon switching the machine on (FIG. 6), after general reset has been commanded and the reset of the RAM 105 and 106 (block 190), the console selectors are read and the spacing which has been selected is stored (block 191). The print head is then brought to the left hand margin (195), and a command is sent to the ribbon advance mechanism 37 to avoid printing with a slack ribbon (block 197), and the daisywheel 28 is rotated to make the point of printing visible.

CPU101 transfers to its store 105 the margin, the bell and the tabulating stops, copying these from the non-volatile store 51 (blocks 192 and 196).

If the margin or bell codes are modified (error in the control code) or the stored left hand margin is more to the right with respect to the physical zero of the machine than the right hand margin, the machine automatically fixes the extreme margins or the bell to 8 position from the right hand margin, behaving as if the operator had not set up the margins. When there is modification in the code of the tabulating stops, the respective stop is cancelled. Until the machine has finished these operations, the keyboards is de-activated (branch 193 and block 194; blocks 190 and 198).

OPERATION

The operating modes of the machine are given below when the various operating keys are operated, with reference to the flow charts in FIGS. 6–16.

MARGIN STORE KEY 58 (FIG. 8)

This makes it possible to store the margins and the bell position. Storage is carried out using as the resolution the sixtieth of an inch for which the position of the margins is unchanged even when there is a change in spacing.

Operation of key 58 fixes the margin at the point occupied by the print head stored in CPASS in the following modes:

when no left hand margin is set up by the operator, the position of the print head is taken as the left hand margin (logic branch 503 output O, blocks 506 and 511)

when the operator has set up the left hand margin but the position of the right hand margin is absent, the position of the print head is taken as the right hand margin (logic branch 504 output O, block 508 (611)

when the operator has set up the left hand margin and the right hand margin the position occupied by the print head is taken as the bell position (logic branch 503 output O, blocks 510 and 511)

in the presence of the left hand margin, the right hand margin, and the bell position all set up by the operator, an error is generated (logic branch 503 output 1).

The use of key 58 also generates an error signal in the following cases:

print head located beyond one of the two margins (logic branch 500, output 1)

print head located in the position already occupied by another margin (logic branches 507 and 509, output 0)

print head located at a distance which is less than or equal to the space occupied by 9 letters with respect to the margin already set up (this distance is respectively 54/60", 45/60", 36/60", 54/60", for the spacings 19,12,15,PS.) (logic branches 507 and 509 output 0). This control has the purpose of preventing the operator accidently setting up the margins too close. This control is inhibited when the bell position is memorised.

Figure 6:
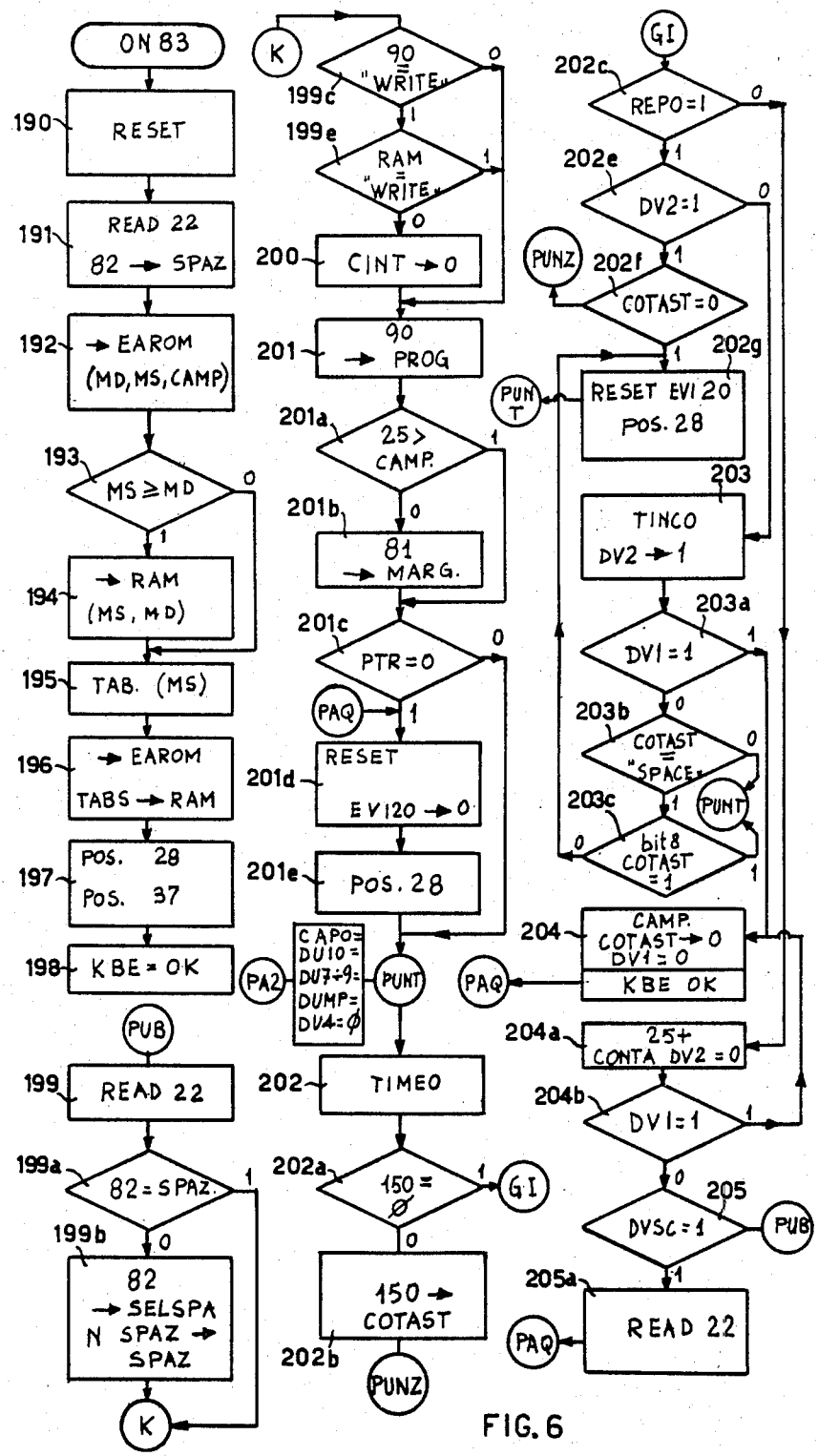

The machine is not able to function without margins and consequently, if the operator has not set them up, it fixes them automatically at the two extreme ends of the travel of the print head (FIG. 6 block 193, 194,).

When the bell position is not set up by the operator, it is stored by the machine at a distance which corresponds to 8 letters with respect to the right hand margin. (This distance is respectively 48/60", 40/60" 32/60" and 48/60" for the spacing 10,12,15, PS).

When the spacing selector is displaced, the bell position will vary as a consequence of this (provided that it has not been fixed by the operator).

The bell position can be superimposed on each one of the two margins and is automatically cancelled out when the right hand margin is cancelled.

When the left hand margin is moved, after the right hand margin and the bell position have been stored it can happen that the bell is positioned before the left hand margin. The machine operates normally except that the acoustic signal is no longer provided.

MARGIN RELEASE KEY 59 (FIG. 13).

This allows the operator to go beyond the margins. It is accepted only if the print head is positioned on a margin. When the machine is writing blind the use of this key is ignored (logic branch 526). By operating it when the machine is in error, the error is cancelled out, the keyboard is again able to accept orders and carries out its functions (block 525).

When followed by operation of the New Line key 60 (carriage return with line space) it carries out positioning of the print head at one inch from the left hand margin (indent) (block 528 CAPO=1) (see also FIG. 9b point NLIN).

KEY FOR CANCELLING TABULATING STOP AND MARGINS (61) (FIG. 14)

In the same way as in normal typewriters this key allows the tabulating stops to be cancelled, and the positions of the margins and the bell. The operation is carried out by bringing the print head to the margin or to the stop which it is desired to cancel and then depressing key 61 (FIG. 14 at point TABO). Cancelling of the bell position is obtained by depressing TAB- immediately after the acoustic signal has been given (branch 536 output 1), or, in an automatic manner, by cancelling the right hand margin (blocks 539,539a).

CANCELLING THE MARGINS, THE BELL POSITION AND THE STOPS (FIG. 14)

This facility is obtained by operating REPEAT key 62 immediately after cancelling the left hand margin (branch 533 DV2=1, branch 542 and block 543). Together with this operation, the optional indent facility is also reset. The print head is not displaced.

CANCELLING THE TABULATING STOPS ONLY (FIG. 14)

This is obtained by operating the key sequence TAB- 61 and then REPEAT 62 with the print head located before or corresponding to the position of the first stop towards the left hand side of the carriage. The margins bell position and the indent facility are not affected. The printing head is not displaced (branch 542 and block 544). The sequence TAB-REPEAT may be used for only cancelling one part of the stops. In this case the print head should be brought to a position which is at least one space beyond the last stop which it is desired to preserve. With this command, the machine cancels out all the stops to the right of the print head.

KEY FOR SETTING UP TABULATING STOPS TAB+ 63

Storage of the tabulating stops is obtained by operating key TAB+ 63 after having brought the print head to a position corresponding to that which is to be stored. TAB+ key is accepted even if the print head has passed beyond one of the two margins (the stops can be located at any position whatsoever which is comprised within the total length of travel of the print head). The tabulating stops can have a maximum number of 20 and are stored in a permanent manner in the non-volatile store and temporarily in the RAM as described above. An error signal is generated if the 21st stop is set up.

Setting up of two stops in the same position is not accepted by the machine. (The imposition of the 2nd is ignored). It is possible to set the stops up at the minimum distance of 1/60" (using the key 66 in proportional operation) and it is possible to superimpose over the margins, over the indent and over the bell position.

SETTING UP STOPS WITH PRINT OF VERTICAL DASH

This is obtained by operating the REPEAT key 62 after setting up the stop. Storage is indicated by the printing of the vertical dash.

If the machine has been prearranged to provide heavy print the vertical dash is stored and then printed out in heavy print.

CANCEL KEY 64

The machine is able to automatically delete a character, a word or a whole line if the operation is carried out before the line buffer has been reset. Deletion is carried out by striking the character to be deleted a second time after having placed the correcting ribbon in position.

CORRECTION OF ONE SINGLE PRINTED CHARACTER

The print head is located over the character which is to be deleted using the spacer bar 65 and the backspace key 66.

Subsequent operation of key 64 causes the code for the character to be extracted from the buffer (block 562 FIG. 15) and the deletion of the character via the points CAN 10, COZA, CRESA and block 567. Position CANCEL=1, in the subsequent printing routine the correcting ribbon is selected, the character taken from the buffer is struck again, thus causing it to be deleted from the sheet of paper; furthermore, position DV8=1, and the spacing of the deleted character is the conserved. Following this, block 569, a spacing code is inserted in the cell of the buffer, and with this code a spacing is associated, which is equal to the one already conserved by the TRO and DRV, or are obtained from dead keys (branch 579, point CPG), which are identified by bits 8, 9-11 and 12 of the cells in the buffer. When two symbols have been printed one above the other, the machine automatically cancels the second one printed only, (the remaining one can be deleted manually carrying out the operations described in the following paragraph). (Block 567 of FIG. 15, FIG. 12-12a, print routine wth DV5=1, CANCEL=1 DV3=1—point ZRO)

DELETION OF SEVERAL CONSECUTIVE CHARACTERS

After the first character has been deleted, the REPEAT key 62 is operated which sets off again CANCEL routine (FIG. 15 with DV2=1).

The machine now (branch 599a and CB2) causes the carriage to return by one space to the following characters, and carries out deletion of them from right to left in the manner which has already been examined. The operation is stopped when key 62 is released. Continuous deletion can however be started again if key 62 is operated again without any other keys been operated in the meantime (in practice DV8=1 after the first deletion and is not reset at the end of carrying out of the program at output PUNT).

Any spaces which occur within the part which is being deleted are automatically jumped (branch 563 output COZA). In the remainder of cases continuous deletion behaves as has been seen for the deletion of one character.

DELETION ON PRECEDING LINES

This type of deletion is used for deleting letters or words which have been printed on lines other than the one being printed and of which there is no longer any storage. In this case the buffer for the current line is reset by operating keys 60 or 67. When the carriage has been located in front of the character to be deleted, the delete key 64 is operated. The cell in the buffer is now empty and holds a space (point COZA branch 564 FIG. 15 output branch 579 output branch 581 output 0). The machine is now set up for deletion (block 591 CAN- CEL=1) which it will carry out when the letter to be deleted is imposed (FIG. 6a of the alphanumeric data processing program point KN with CANCEL=1 blocks 210a-221c).

The deleting mode is cancelled out by pressing a service key.

In this case as well the print head does not move. When it is necessary to delete several characters which are not stored it is necessary to select the characters one by one and repeat the operations described. This also holds for deletion of several characters which have been printed in the same position or for dead keys.

Characters which have been underlined or printed in heavy print can be automatically corrected by suitably locating the selector before correction. The letters used for the deleting operation are in this case not stored in the buffer, which remains empty (see print routine in FIGS. 12 and 12a with DVGRASS−1, CANCEL=1 and DV3=1).

Under proportional writing conditions, correct positioning of the print head over the character to be corrected is obtained by using key 68 for "½ backspace". This, actually, makes it possible to cause the print head to move back by 1/60 of an inch each time it is operated.

DELETION OF THE PART IMPOSED UNDER BLIND WRITING CONDITIONS

When the machine is writing blind key 64 causes erasure of the part which has not yet been printed from the line buffer. This holds for all types of blind writing (FIG. 15 branch 550 output 1 and block 600-609).

RESETTING OF NON-VOLATILE STORE

Operation of delete key 64 preceded by keys PM1, PM2 or PM3 causes resetting of the store which has been selected. Together with the resetting operation, specialisation of the store for constant phrase or page layout is also effected (FIG. 15, output 1 from branch 554 and blocks 610-615; for the page layout specialisation output 1 from branch 611; for constant phrase specialisation output 0 from branch 611−).

CARRIAGE RETURN WITHOUT LINE SPACE 72

Operation of this causes the print head to become located at the left hand margin without the buffer being reset. When there is an error state in the machine, external signals are cancelled out, the keyboard is re-activated and the print head is positioned at the left hand margin.

By operating the margin release key 59 (DVLM=1 and then key 72 it is possible to go beyond the left hand margin, only if the print head is on the left hand margin).

With the machine set up to write blind, print is started and the print head is left positioned one space beyond the last character printed in order to facilitate correction.

Key 72 causes the print head to be positioned on the left hand margin even if the machine is set for automatic indent. During recording of the stops for page layout, it makes it possible to cancel the stops stored for the last line. Each time it is operated, the last stop is cancelled out from the store and the head is positioned at the position occupied by the stop itself. The operation may be repeated in order to cancel out all the stops in the line.

When the latter has been completed, subsequent instructions from the keyboard are ignored. Operation of key 72 followed by PM1, PM2 or PM3 makes it possible to start the page layout operation from the beginning as will be described below.

CONTINUOUS LINE SPACE KEY 67

Operation of this causes the line spacings indicated by the relative selector to be carried out and the buffer contents are reset. The position of the print head is not moved. With the machine set up to write blind print is started and this carries out its function.

When operated when an error is present, it cancels out signaling from outside, re-activates the keyboard and carries out its function. It starts recording the constant phrase and, at the end, carries out its function. When it is followed by operation of REPEAT key 62, it makes it possible to carry out repeated line spacing.

INDENT SET KEY (AUTOMATIC INDENT) 75

This makes it possible to arrange for print of a paragraph which is aligned on a point which is not the left hand margin (INDENT). This facility is obtained by operating key 75 after bringing the print head to the desired point which is stored in the INDENT cell.

This point must be selected so as to be within the margins since if this is not the case the machine will give an indication of error. From this moment on, the machine, whenever the New Line key 60 is operated, will consider the previously stored point as the left hand margin. This same thing occurs in the case of automatic return to start of line (ADJUST) and with right hand margining. Keys 66 and 72 ignore the preset indent provision. Positioning at the point of indent does not occur if the print head is to the left of the predetermined point.

In this case, when key 60 is operated, positioning on the left hand margin is obtained.

Return to normal operation is obtained by pressing key 75 again, or by operating TAB- with the print head located at the point of indent. (This preset condition is also cancelled out when the stops and the margins are cancelled using TAB 61 and REPEAT 62).

Cancelling out of the indent state also occurs if key 75 is operated with the print head beyond the margins.

SELECTOR KEY FOR STORES PM1 PM2, PM3

These govern the non-volatile stores. They cancel out possible signaling of an error and re-activate the keyboard. They become repeaters using REPEAT if the corresponding store holds a page layout. For their use see the following paragraphs:

ALPHABETIC TABULATING KEY 71

Operation of key 71 causes the print head to move towards the right and take up a position on the first stop. In the absence of a stop the print head stops at the right hand margin. If the print head is already beyond the right hand margin and does not meet a stop, it comes to a halt at the end of its path of travel.

In order to go beyond the right hand margin, margin release key 59 is operated before key 71.

Successive selection of the stops can be obtained by operating REPEAT key 62 after key 71.

The machine will select each stop at a time and will halt for an instant at each one in order to allow the operator to cause it to stop on the desired one. Release of key 62 causes the print head to come to a halt on the last stop selected.

During tabulation, an acoustic signal is provided if the print head reaches, or goes beyond, the bell position.

The characters printed after the selection of an alphabetic tabulating stop are written normally towards the right and aligned on the stop. With proportional spacing, alignment is carried out taking into account the dimensions of the first character printed.

If the stop selected provides for the print of the vertical columning line, after having reached the stop, the machine prints the symbol and advances by one space. The symbol is stored in the buffer.

DECIMAL TABULATING KEY 73 TABDEC

Operation of this causes displacement of the print head towards the right and its positioning on the first stop in an identical manner to what occurred when key 71 was operated.

Figure 7:
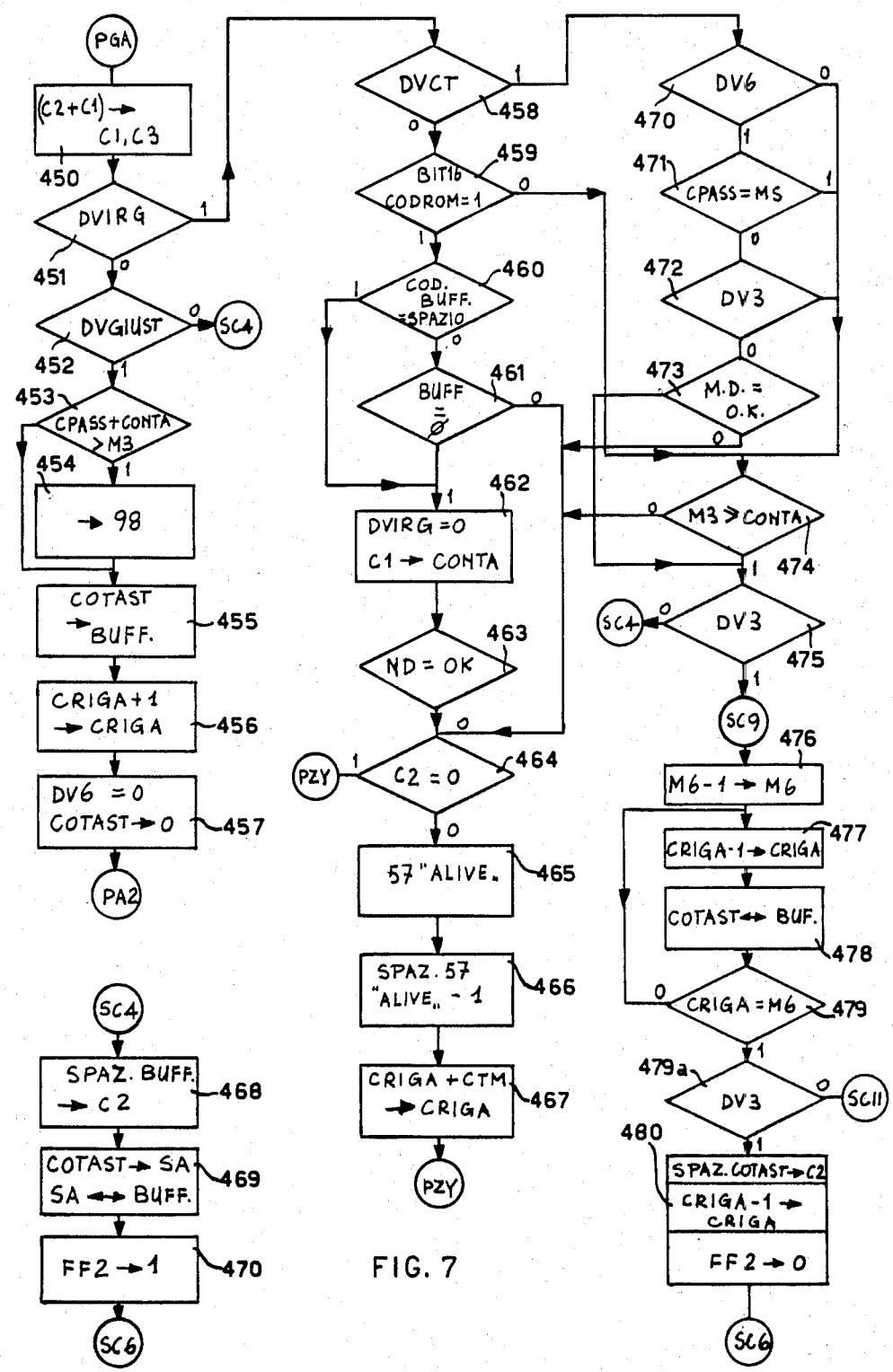

In this case, however, the machine, after having reached the stop, sets itself to write blind (DVSC=1, DVCT=0, DVRG=1, DVGIUST=0, FIGS. 7–7c). Key 73 does not cause print of the vertical columning. When it is operated with the machine writing blind, it starts print and selects the following stop.

The machine is pre-arranged for providing columns of numbers when tabulation is commanded using key 73.

When it has reached the stop, the machine writes blind and waits for the number or the phrase to be written in a column to be imposed from the keyboard (FIGS. 7–7c with DVIRG=1, DVCT=0 DVSC=1). The number is typed in complete with the comma (decimal point) starting with the most significant figure.

The portion which has not yet been printed can be cancelled out using key 64. When the keyboard orders have been completed print is obtained by operating the keys referred to above.

Key 72 leaves the print head position one space beyond the last character printed whilst the other keys, at the end of printing, carry out their function. Drawing up of columns is carried out in the following manner:

(a) numerical imposition

Alignment takes place with respect to a code for the column layout which may be the comma, or the decimal point (for the USA) (FIGS. 7–7c with DVIRG=1, DVCT=0, control code for columning in logic branch 459). The comma (or decimal point) is printed correspoding to the stop position. When the number does not include decimals, the machine takes into account the space occupied by the comma (or decimal point) and prints the first figure of the number, displaced by one space with respect to the stop.

This makes it possible to line up numbers having decimals with numbers not having decimals.

(b) alphabetic imposition (FIGS. 7–7c, DVSC=1, DVCT=0, DVIRG=1).

The machine aligns the last right hand character of the word imposed with the stop (the symbol terminates at the point corresponding to the stop). With proportional spacing, in order to carry out this alignment, account is taken of the dimensions of the last character printed before the stop. When aligning alphabetic regions, the use of the comma key (or decimal point) key should be avoided, since in this case the machine will behave in the same way as for providing columns of numbers.

SPACER KEY

This causes the print head to move one space to the right. When pressed through an extra length of travel it causes continuous advance to take place, at the rate of about 60 msec per space.

When the pre-arranged adjust state is provided, it carries out the functions of the New Line key 60, if it is imposed with the print head located beyond the bell position.

When the print head is located in a region of the line already printed, the amount of advance provided for by the space key is that which is stored in the buffer.

If the print head becomes displaced into a region occupied by spaces, these are switched in the new spacing if the operator has displaced the selector.

Figure 6A:
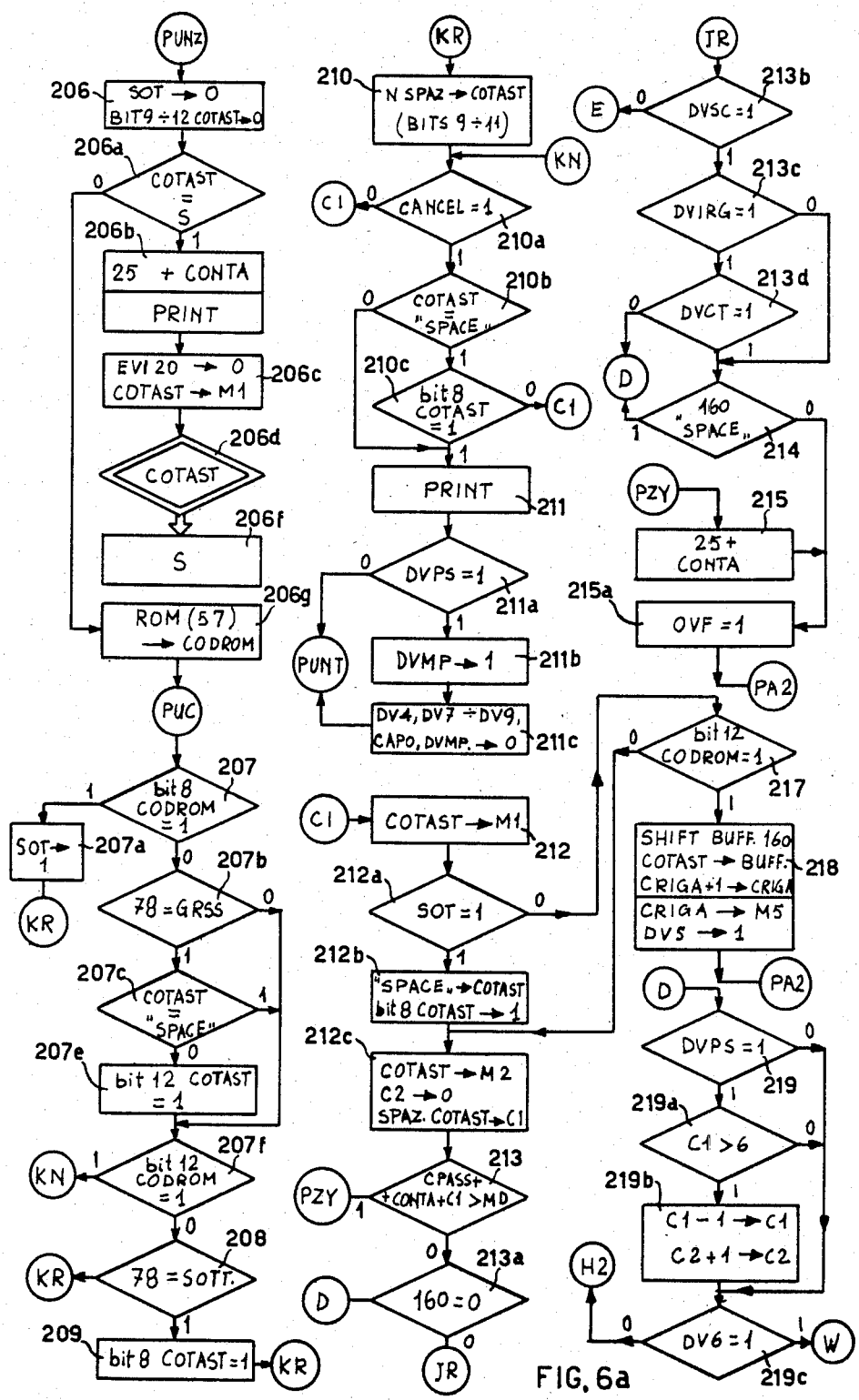

With the machine set up for automatic underlining the space key prints the underlined symbol (FIG. 6a, branch 207c and 208 with output 1, block 209).

RIGHT HAND MARGIN

Three types of right hand margining are provided: normal, adjust, justification.

The choice of these is carried out by locating selector 81 at the appropriate point. Switching of the selector is only accepted if it is carried out when the print head has not yet passed beyond the bell position.

If switching is carried out afterwards, the machine does not provide the new type of margin until the following line (FIG. 6 logic branch 201a and output 1, it skips the reading of the margining selector of block 201 if the print head is beyond the bell position).

(a) normal margining.

The machine operates as a conventional typewriter. The acoustic signal informs the operator that the print head is approaching the right hand margin so that the line can be completed and the carriage returned using key 60 (FIG. 6b, block 245).

(b) adjust

The machine automatically provides for return to the start of a new line when the operator presses the spacer bar 65 or imposes a hyphen when the print head is located between the bell position and the right hand margin. The setting of the machine to provide indent is respected.

Figure 6B:
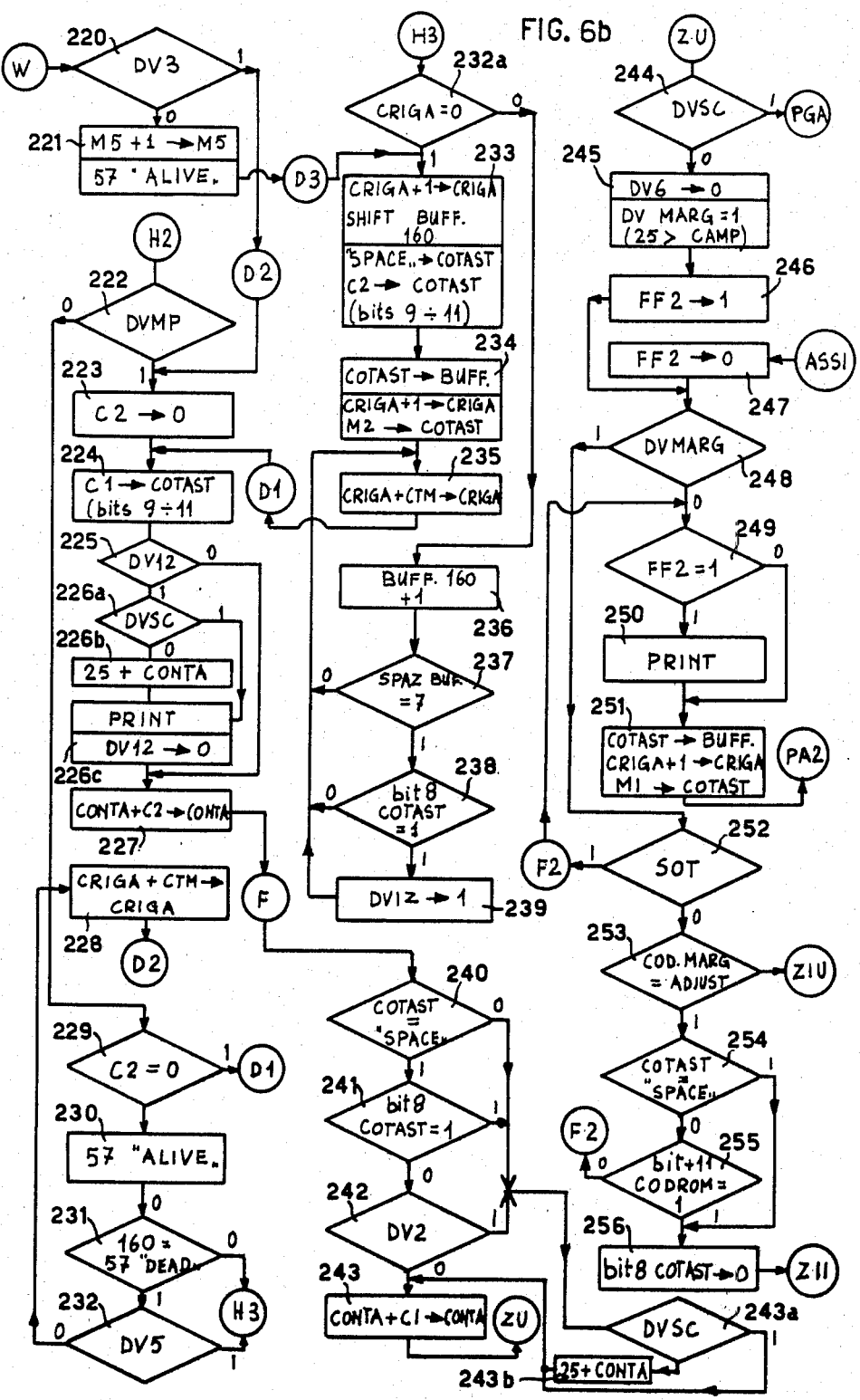

If automatic underlining has been called for, the space or the hyphen which cause the print head to return to the start of a new line are not underlined (FIG. 6b and 6d from point ZU; control of space/hyphen is carried out in branches 254 and 255; the change to provide for start of a new line is provided by the output from block 261).

(c) justification (RIGHT).

The machine carries out justification of the right hand margin by aligning the last character printed of each line. The operation takes place by imposing a portion of the line in the blind state using the methods described below.

before positioning the selector to Right, the operator must store the margins and the bell position. The bell indicates the point at which writing blind starts and is set up at a position which is a function of the dimensions of the line of print. Consequently the accuracy of the right hand margin will be greater as the portion imposed blind increases, the operator may set up the bell position to coincide with the left hand margin and write the whole of the line blind, except for the first word.

Print of the portion of the line comprised between the left hand margin and the bell takes place in the normal manner. In accordance with one aspect of the present invention, when the acoustic signal has been provided, the machine still carries on printing until the first space is reached (end of a word), after which it changes over to write blind. As shown in flow chart in FIG. 6e point ZIU, control of selector 81 when justification is being carried out is done in branch 262 and control for digitizing the space key is carried out in branch 263. If a character key has been operated, there is a change, provided by point $E_2$, to the print routine 250 for the character digitized (FIG. 6b). Then, when the spacer bar is operated, and carriage 25 is not outside the margins (branch 264, FIG. 6e) buffer is updated (block 266) and carriage 25 is displaced from the possible residual parts of CONTA. Using operation 268, a region to the left of the right hand margin is pre-arranged in M3, for informing the operator acoustically that the right hand margin is being approached and CRIGA then with the cell of the buffer indicating the passage under blind writing conditions are kept in M6. The passage under blind write takes place in block 269 putting DVSC to 1 and DVGIUST to 1, and DVRG and DVCT to 0. Passing through point CT8 in FIG. 10, PA2 in FIG. 6D and PUNT in FIG. 6, the code for the depressed key is introduced into buffer 160, with the relevant spacing (block 455 in FIG. 7), via PUNZ, PUC and C1 in FIG. 6A, W (FIG. 6B) and PGA (FIG. 7) with all the conditions commanded by console 22. The operator continues to type in the phrase which is then stored in the line buffer (FIGS. 7-7c), whilst a fresh acoustic signal advises the operator that the right hand margin is being approached.

In particular, in block 268 FIG. 6e, the first acoustic signal for the space available for printing before the right hand margin is reached is determined by selector 82 and is respectively 42,35,28 or 42/60" for spacings of 1/10", 1/12" 1/15" or PS, equal to 7 characters. The acoustic signal is issued along with each one of the last seven impositions, FIG. 7 point PGA, by means of branches 451 and 452, when branch 453 indicates that the spaces put into effect (CPASS) plus those improved (CONTA) exceed M3. Bell 98 is operated in block 454 at each imposition beyond M3. In this space, the operator must stop or interrupt the word which is being printed. In the case when, with imposition, the margin is passed, this is recognised in branch 213 (FIG. 6A) and, by means of PZY and 215A, causes an error signal to be produced OUF=1.

Print of the margined line is obtained by operating service keys 60, 72, 67, 71 and 73 and these are recognised in branch 206a (FIG. 6A) and carries out according to flow N. LINE DUSC=1 of FIG. 7.

Right hand margining is obtained by expanding the spaces between one word and the next, in the part of the line imposed blind, comprising what has caused the passage under blind conditions. The machine selects the spaces one at a time starting with the first one at the left and adds 1/60" to each one. When the selection of all the spaces is completed, if the last word does still not coincide with the right hand margin, the operation is repeated from the beginning and terminates when the last letter to be printed reaches the right hand margin (FIG. 9, point AR and R, block 312-325). This arrangement makes it possible, with proportional spacing, to take the dimensions of the last character printed into account.

Possible spaces of the end of the line are cancelled out from the buffer before starting the right hand margining operation even if they are underlined (FIG. 9 loop between point YR10 and cell 317 which continues until a character is recognized in branch 315 which is different from a space code). From point R321, return to the first space is done and the difference of the spaces in the justified line, with respect to M3, is kept respectively in M5 and M3. If this difference is 0, the contents of the buffer are printed straight away by means of M3, LINI, INT B and the print routine of buffer 303. If, on the other hand, the line must be justified and the first space is not 7 (branch 323b), one element of space (block 324) is added to the code for the 1st space, via QUA and 319 removal from M3 is effected, block 319a) and a further check is carried out to see if M3 is not 0. Then the other cells of the buffer are explored until a further space is found.

When the spacing code of the character spaces is no longer able to memorise the distance between two adjacent words (at the most it is able to memorise 7/60") the machine inserts a fictitious code, via M1, displacing the content of the buffer by one position (FIG. 9, output from logic branch 323b and 318). The successive sixtieths of an inch are stored in this new space.

Right hand margining is only carried out if the key which starts print is operated after the machine has given the first acoustic signal. Should this not be the case, margining is not carried out and the part imposed blind is printed out normally (FIG. 9, branch 312 output 1 and blocks 308, 303).

This has the purpose of terminating the paragraph in the correct manner.

Should the operator reach the last 7 characters of the line using the spacer bar, margining is also carried out even if, after cancelling of the end of line spaces, the last letter to be printed does reach the last 7 characters.

When preparation of the line is completed, the machine prints it out and at the end carries out the functions relating to the imposed key as indicated above.

The portion of the line imposed blind can be deleted making use of delete key 64.

During ring hand margining it is not possible to go beyond the right hand margin since, when the machine is printing blind, key 58 is ignored.

During blind digitizing with right hand margining, an error signal is provided when the right hand margin is reached (after the 7th acoustic signal) (branch 463 point PZY). At this point the operator is able to cancel the portion which has not yet been printed and reimpose it or cause the printing of it by operating one of the keys provided.

Right hand margining is compatible with all the predispositions of the machine.

ADMINISTRATION OF LINE BUFFER.

All the symbols printed by the machine are stored in the buffer. A space is considered to be a character. When the machine performs a tabulation, the displacement of the carriage is stored in the buffer by loading it with a series of space codes having the spacing indicated by the selector (FIGS. 6-6d and FIGS. 7-7b).

Any possible remainders are inserted at the penultimate space before the stop (FIGS. 10a-10b buffer adjust routine). The dead keys are stored in the buffer with zero spacing codes. (FIG. 6 a branch 217 output 1, block 218). In this case two positions in the buffer are occupied by each print position. (It is nevertheless possible to store quite a few dead keys in the buffer, since the maximum number of characters which can be printed in one line is 198 and the buffer has 256 positions).

Print from a dead key in a region of a line which is already printed causes shift to the right of all the characters already stored in order to provide a position in the buffer in which the dead key can be stored. (FIG. 6c print routine and advance over region of line already written).

Figure 6C:
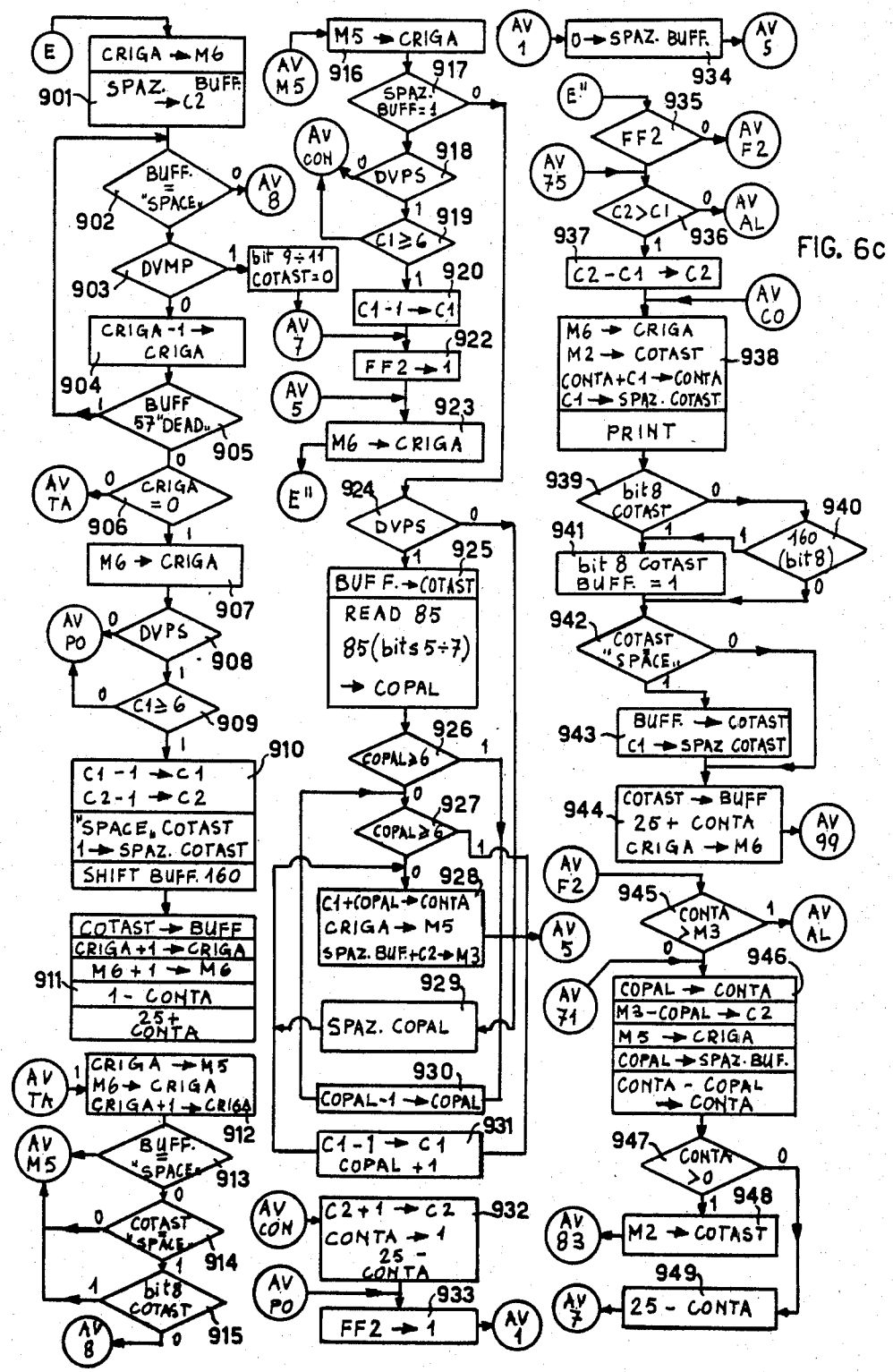

If a symbol is printed in a region of a line which is already printed (two superimposed symbols) the second symbol remains stored in the buffer (FIG. 6c from pont AV8). When a correcting operation is carried out, using delete key 64, the deleted character is transformed into a space. The spacing remains unchanged (FIG. 15 cancel routine blocks 602-604).

If the deleted character consisted of a dead key, this is transformed into a space code with zero spacing (FIG. 15 block 603 with C1=0).

Spaces beyond the position occupied by the print head should not remain stored, if these spaces are not followed by a printed letter. For this reason, if the deleted letter is the last one printed, the relative buffer position is reset (FIG. 15, blocks 606-607).

The same thing happens by causing the print head to move back onto a region of line consisting of spaces not followed by a letter. The space code is not stored if the region in the buffer corresponding to the position of the print head is occupied by a character. (FIG. 6c).

If the region of the buffer contains spaces, these are transformed, always with the imposition of the space key, to the new spacing if the operator has displaced the selector (FIG. 6c).

Selection of a stop with print of the vertical columning leads to storage in the buffer of the relative code.

The content of the buffer is reset in the following cases:

- operation of keys for return to start of line or line space
- imposing a space or hyphen with the machine preset for adjust
- operating a PM key for print for recording a constant phrase
- change of line during carrying out of page layout or print of the constat phrase.

MACHINE BEHAVIOUR DURING PRINT OF ONE LINE

When the print head returns to the start of a line using key 60, the axis of the striking hammer coincides with the left hand margin.

The first letter of the line is printed in this position when the fixed spacings are selected. In accordance with one aspect of the present invention, under proportional conditions, the characters spaced by 4/60" and 5/60" respectively, are printed as if the spacing were fixed, whilst with spacings of 6/60" and 7/60" respectively they are printed after an advance of 1/60".

Actually, the striking hammer is off centre with respect to the centre of the character by 1/240" to the right of the character for 4/60" and 6/60" to the left for those of 5/60" and 7/60".

More in particular, when the character to be printed has a spacing of 6/60" or 7/60", advance of the head by 1/60" is commanded, +1 is added to the spacing code for the preceding character printed which is already stored in the buffer, the character is printed, and the print head is advanced by the spacing provided for the unit decreased by 1/60. (FIG. 6a branch 219 and 219a output 1 block 219b—point H2, branch 229 output 0 branch 231 output 0—point H3, blocks 236-239, branch 225 output 1 block 226).

This system provides automatically for left hand alignment.

During print of the line, the acoustic signal is provided when the print head passes beyond the bell position (FIG. 6b block 245). Halt on the right hand margin takes place in the following manner:

Before printing a character, the machine carries out a check that the advance which it must carry out after the print does not cause it to pass beyond the margin. If this does happen, the letter is not printed and an error signal is provided. (FIG. 6a block 212c, branch 213 with output on PZY is there is an error). This ensures that, if the operator is working with fixed spacing and has memorised the margins with the same spacing for print, the print head always stops perfectly aligned with the right hand margin.

If the operator is using a spacing for print which differs from that used for memorising the stops, the head may stop at a distance from the margin which varies from 0 to 5/60".

Under proportional spacing conditions the print head may stop at a distance from the margin which varies from 0 to 6/60". With right hand margining, the print head always stops in perfect alignment with the right hand margin, both with fixed spacing and with proportional spacing.

SWITCHING OF THE WRITE INTERVAL

As has already been said the machine is able to print with spacing of: 1/10" 1/12" 1/15" and PS (proportional 4,5,6,7/60"). Selection of the print interval is obtained by positioning spacing selector 80. In accordance with a further aspect of the present invention switching may take place at any point whatsoever in the line and is accepted by the machine only when the keyboard buffer is empty (FIG. 6, point PUB, blocks 199-199b which jumps from output S1 of branch 202a after having passed through blocks 202-205).

The line buffer always stores the image of the line so that automatic correction is always possible even if the spacing is changed. The position of the margins the bell, the tabulating stops the indent, the stops for page layout and the points for start of print of the constant phrases do no change when spacing selector 80 is displaced.

The line buffer is able to hold all the characters which can be printed in one line, whatever the selected spacing may be.

VARIOUS PRINT POSSIBILITIES

Selector 78 is provided having four positions, by means of which the operator is able to vary the print manner when imposing a line.

The positions are:

Normal, automatic underline, heavy print, contemporaneous underline and heavy print.

(a) normal print

The machine behaves in the same way as a normal typewriter.

(b) automatic underline

The machine is able to automatically underline all the characters selected after this facility has been set up. In particular, operation of selector 78 gives a value of 1 to bit 8 of COTAST.

Before printing the imposed letter, the machine prints the symbol "___". (The symbol "___" is printed before the character.) (FIG. 6A and blocks 208–209). In FIG. 12, the print routine checks in branch 705 if the machine is set up for underlining (bit 8 of COTAST=1) and if it is 1 it carries out selection of the symbol, underlined with DV3=1. In block 710 the underlining code from ROM goes to CODROM (SOTT→CODROM);, a check is carried out that there is no cancelling (705b), the inked ribbon 707 is selected and the petal of the daisy wheel with the symbol "___" (728), the stopping of the two ribbons is waited for (MTF1=MTF2 =0), and it is printed (blocks 730–731). Then the character from point COG is prited via blocks 705–707 and 728–731).

Underlining is carried out concomitantly with the 48 alphanumeric keys and with the space and is compatible with all the other machines facilities.

Under proportional spacing conditions, every time the print head is to carry out an advance of 7/60" (DV12=1), the machine prints the underline symbol, advances by 1/60", reprints the underline symbol, prints the letter and carries out an advance of 6/60" (FIG. 12a, branch 741 output S1, branch 734 and 737 output 1 branch 738 output 1 and branch 739 output 1 after the print of the first "___" symbol).

This makes it possible to obtain the continuous line even if the "___" symbol which has a width of 6/60" does not manage to cover the space of the character to be underlined.

Under proportional conditions, the underline symbol will consequently be printed superimposed each time that advances are carried out of 4/60" 5/60" and 7/60". For better print quality, after printing the symbol "___" the machine commands the ribbon advance device twice (FIG. 12 block 735, 736).

(c) printing in heavy print

The machine is able to carry out printing in heavy print by striking the character printed twice after the print head has been advanced by 1/180".

This facility is obtained by putting selector 78 to HEAVY PRINT.

When this selector is sensed, bit 12 of COTAST goes to 1. After the print of a character, branch 732b (FIG. 12), the print head is advanced by 1/180", the ribbon advances (733 FIG. 12a) and another print cycle is carried out from PSEGU. In this way, all the symbols which can be printed by the machine are written in heavy print. Printing in heavy print is compatible with all the other facilities of the machine. The only character which is not printed in heavy print is "___" (FIG. 12 with bit 12 of COTAST=1, branch 732 output 1, branch 732c output 0 after the first print, block 733 and jump to point PSEGU for the second print).

(d) printing in heavy print with underlining

The machine prints and carries out the operations indicated in the two preceding paragraphs (b) and (c).

NON-VOLATILE STORE

As has already been described, in accordance with the invention, the typewriter is able to store data in a permanent manner which can be recalled automatically. For this, three stores M1, M2, M3 in EAROM 51 (FIG. 2) are each able to hold either a constant phrase or a page layout. These are governed by keys PM1, PM2, PM3, (FIG. 1) which provide for recording, cancelling and read. Specialisation of store EAROM for page layout or the constant phrase is obtained using the upper case/lower case selector key 97 when carrying out cancelling: upper case (caps.) for page layout, lower case (small) for the constant phrase.

CONSTANT PHRASE

The constant phrases which can be stored in EAROM are of three types:

(1) Constant phrase linked to the left hand margin.

This is provided for by depressing the key relating to the store concerned, when carrying out recording with the print head positioned at the left hand margin. When print is called for, the phrase is always printed at the same distance from the left hand margin. (The distance is the one which the operator sets when recording the phrase).

(2) Constant phrase in a column bounded by the right hand margin.

This is arranged for by depressing the key relating to the store concerned when carrying out recording, with the print head located on the right hand margin. When print is called for the phrase is printed out in a column bounded by the right hand margin.

(3) Free phrase.

This is provided for by depressing the key relating to the store concerned, when carrying out recording, with the print head away from the margins. When print is called for, the phrase is printed out starting from the point occupied by the print head when the key PM is depressed.

ERASING THE STORE AND SPECIALISATION FOR CONSTANT PHRASE

For clearing the store and setting it up to store the constant phrase, the following operations are carried out: the program selector 90 is brought to WRITE; selector 97 is set for the lower case and the key for PM1, PM2 or PM3 for the store to be cleared is depressed followed by the cancel key 64 (FIG. 15 blocks 610–615), thus providing EAROM with a code enabling it to write. Then the key for the store concerned is depressed after having positioned the carriage in one of the three positions indicated (bit 13 of COPA=0) for selecting the type of phrase which it is desired to store (FIG. 16 circuit 802). The code of the keys PM1–PM3 is memorised in block 803), then block 804 resets the buffer, puts the number of spaces C PASS of the print head to CONTA, the tabulating STOP to C PASS and stores C PASS to store M9. When the phrase is printed out, the machine will reproduce the same situation by providing tabulation of the same length. In the case of phrases in columns against the right hand margin, use of key PM also frees the margin (block 805A) so that the operator is able to start printing of the phrase beyond the margin. During the subsequent printing however this will be printed aligned with the margin. If the operator desires to record the phrase and to also have the first print aligned with the right hand margin, the key CENTER is used after key PM and the phrase is written blind (FIG. 10). On termination of the imposition, printing is caused to occur using keys 72 and 60. When imposition of the phrase has been terminated, it is still possible to correct any possible errors using key 64.

When the phrase is "correct", by the use of key 60, transfer of the contents of the line buffer into the non-volatile store is obtained. The machine writes the characters of the phrase in the store preceded by a start line code X which indicates the distance of the first character from the margin selected (blocks 330–334 of FIG.

9a). At the end, block 326 (FIG. 9B), key 60 carries out it function. If the phrase causes the store to be overloaded the machine signals that an error has occured.

The machine is able to store phrases made up of several lines. The number of lines is limited by the capacity of the store. Recording is obtained by repeating the operation described in the preceding paragraph for each line, without resetting the store. Each line may be stored in one of the three modes provided for (bound to the left hand margin, free, etc). When printing is being carried out, the store, on each occasion when the machine encounters a code indicating the end of the line, carries out the line spacing indicated by the selector (FIG. 16 branch 814, block 817).

RECORDING OF THE CONSTANT PHRASE USING THE SECOND KEYBOARD

This obtained by positioning selector 90 to WRITE for choosing the type of phrase desired, bringing it to KB11 for imposing the phrase, and bringing it back to WRITE before operating key 60. For print it is necessary to position the selector 90 to KB11.

PRINT OF THE CONSTANT PHRASE

This is obtained by operating key PM relating to the store concerned with selector 90 at NORM or KBII. The machine extracts the lines one by one which compose the phrase and prints them. At each change of line, the line spacing from the selector is carried out. When it encounters the end of phrase codes without characters, it carries out the line spacing from the selector on each occasion (FIG. 16 blocks 811–819). Print is carried out maintaining the spacing used for recording. The machine takes the margins into account only for establishing the point of the start of print.

PAGE LAYOUT

The typewriter is able to simplify the drawing up of pre-printed forms by selecting, in an automatic manner, the points at which it should print. Each one of the three stores may be set up to record a page layout, when carrying out cancelling, the key PM concerned is operated for the upper case. The capacities of the three stores remain unchanged.

RECORDING OF PAGE LAYOUT

To record page layout, the following sequence is followed:
selector 90 is put in the WRITE position; from this moment on counter CINT is enabled and this stores the number of commands sent to the line spacing device.
store EAROM is cleared and put in a position to receive orders by operating keys PM and 64 in the upper case; the content of line spacing counter CINT is cleared (FIG. 15 block 612)
the points for start of print provided on the form are selected one by one, and when one is reached the key PM concerned is operated; at each imposition the machine stores the point occupied by the print head and the commands sent to the line spacing device (FIG. 16 block 807). At each storage operation, the line spacing counter is reset. If the capacity of the store is exceeded, an error signal is produced. The operator may continue the recording by using another store (FIG. 16 block 809).

Recording of page layout can take place superimposed over the compiling of the first form, since the machine is operating normally.

CARRYING OUT OF PAGE LAYOUT

This is obtained in the following manner:
program selector 90 is set to NORM or to KBII
key 72 is operated to provide the starting state for the carrying out operation; this operation initializes all the stores containing page layout.
Key PM of the store concerned is operated; the machine carries out the stored line spacing and moves to the first stop. (FIG. 16 blocks 823–827).

Carrying out of the page layout can also be obtained by operating key PM relating to another store provided that this contains a page layout. If it contains a constant phrase, this is printed out to allow the use of the constant phrases in conjunction with the page layout. When the last stop in the store has been carried out, key PM is ignored.

The same thing happens if the store is empty.

In the case where page layouts are stored in two or more stores at the end of the carrying out of the stops in the first store, key 72 is re-imposed and the work procedes by operating key PM of the second store.

The stops can be selected rapidly by operating key 62 after PM; the machine selects them one at a time pausing for an instant at each one to allow the operator to stop on the desired point. (FIG. 16 block 827).

CENTERING OF TITLES

By operating key 70, initially a control of the useful field for the title is carried out. Should the line be partially printed, this field is limited by the consecutive spaces existing between the printed characters. Should there be no printed characters in the line, the useful field is, on the other hand, limited by the margins. The useful field is still limited by the point for centering selected by the operator. For this purpose the machine calculates the elementary spaces (1/60") between the point selected and the closest limit of the field: in order avoid superpositioning, the length of the tiltle centered will at the most be equal to double the calculated space. This space is stored as a reference length. If, on the other hand, it is desired to align the title with the right hand margin, the useful field will be limited to the spaces to the left of this margin.

By digitizing the keys of the characters, these are introduced into the buffer, starting from the cell of the buffer corresponding to the point chosen. Each time a new character is imposed, the content of the buffer is displaced to the left by one space, this space being equal to half the space of the digitized character in the case of true and real centering and is, on the other hand, equal to the whole of the space in the case of a title aligned at the left hand side. The characters stored preserve their spacing and the buffer mirrors in this case, as well, the real situation which is present or will be present during printing of the line of writing. The spaces of the characters are furthermore accumulated and compared with the reference length, an error signal being produced in the case of overflow. When carrying out print, the carriage or print head 25 will become displaced (carrying out tabulation) to the calculated position at which the first letter of the title is to be printed and will subsequently carry out print from the buffer of the stored title.

TITLE CENTERING REFERRED TO THE MARGINS

This is selected by operating key CENTER 70 (FIG. 10) when the machine is not writing blind OVSC=0 branch 400) and with the print head located on the left hand margin (output 1 from branch 402). The machine calculates, in elementary spaces (1/60"), half the length of the line of writing as defined by the margins and stores it in MC and in CONTA (blocks 401 and 403).

Then the program carried out subroutine AGG-.BUFF (FIG. 10A from block 980 to block 997b and FIG. 10b from block 998 to block 999d, via point LIPU), which, in this case, is limited to loading line buffer 160 with as many spacing codes as are necessary in order to exactly reach the middle of the line of writing M3). The spaces are inserted from the character which is more to the right printed in the line of writing and stored in line buffer 160 and the spacing of each space is 5/60" for proportional spacing (DVPS=1) and equal to the spacing from selector 82 in other cases (DVPS=0) (branch 988 blocks 989,990,991,987, and from 992 to 994).

At the end of this subroutine (block 998B FIG. 10B), CRIGA is directed to the cell of buffer 160 immediately following the one in which the last space has been stored, i.e. the cell which, in the line of print, corresponds to the center. The routine SET 70 (FIG. 10) continues, first storing in M6 (block 405) this particular value of CRIGA and then proceeds to carry out the subroutine "SPACE (BUFF)" (block 406 and FIG. 10C) and this routine, at the end of centering, determines the number of consecutive spaces and the consequent width in 1/60" of the field which is available at the left (FF2=0) and at the right (FF2=1) from the center of the line of writing. The minor field is stored in M3, and is possibly limited by the preceding content, and the phrase to be centered should not exceed twice M3. This value 2×M3 is consequently calculated and stored again in M3 (block 407 of FIG. 10).

The program continues by imposing blind writing (DVSC=1), the condition that the next character digitized will be the first blind one (DV6=1) and the condition for centering with respect to one point (DVCT=1 and DV3=0) (blocks 407-410) while waiting (point PA2) for the imposition of the characters, as will be described below.

CENTERING WITH RESPECT TO ONE POINT SELECTED BY THE OPERATOR

This is selected by imposing key CENTER 70 (FIG. 10) when the machine is not writing blind (DVFC=0) and the print head is positioned between the margins (logic branch 402, output 0 and logic branch 411 output 1).

After having stored half the line of writing in M3 (block 401), the program carries out a check to see if the margin release key has previously been operated (DVLM=1 in branch 415) and should this be the case, the physical maximum of the length of line (792×1/60" block 415) is stored in M3 and then a check is carried out to see if print head 25 is located at a position beyond the half way point of the line, and should this be the case (branch 417 output 1 branch 413 output 1), M3 is caused to store the distance which separates it from the real right hand margin (block 419) or physical right hand margin if DVLM=1 (block 418). If, on the other hand, the print head is closer to the left hand margin (branch 417 output 0 and branch 413 output 0) the distance is stored which separates it from the physical left hand margin if DVLM=1 (block 420) or the imposed margin (DVLM=0 block 416).

The program then jumps to point CT60 and carries on in an identical manner to what has been described with reference to centering with respect to the margins, except for the fact that now M3 stores the effective field which is available for centering and M6 stores the address of the cell of buffer 160 which corresponds to the selected point.

ALIGNMENT OF THE RIGHT HAND MARGIN

This is selected by imposing key CENTER 70 (FIG. 10) with the machine not writing blind (DVSC=0 branch 400) and with the print head 25 on the right hand margin or in immediate proximity to it, i.e. located from it at a distance of less than 7 spaces of 1/60" in (branch 411 output 0). Under these conditions, the routine SET 70 stores the conditions for writing blind (DVSC=1) from operation of key 70 (DVCT=T) (FIG. 10B) and for alignment at the right hand side (DV3=1) (block 414a FIG. 10d); M3 then stores the number of spaces in 1/60" between the position of print head 25 and the left hand margin (block 414d) and which corresponds to the whole length of the line of writing. In this case, M6 is caused to store the address of the cell of the buffer corresponding to the right hand margin (block 414e) and subroutine SPACE (BUFF) (block 414f) is carried out, which performs possible reduction of the content of M3, as described above, in order to take into account the characters written in the line. The program then jumps to point CT7 of FIG. 10 and proceeds as has already been described, via blocks 409 and 410 and point PA2 whilst waiting for imposition of the phrase.

IMPOSING THE PHRASE TO BE POSITIONED WITH BLIND WRITING

As has already been described, CRIGA directs itself to the cell of buffer 160 which is adapted to store the code of the first character to be digitized blind. This cell is either the center of the line of writing in the case of centering with respect to the margins, or the point selected by the operator, in the case of centering with respect to this point, or the right hand margin in the case of alignment at the right hand side. The value of CRIGA is furthermore stored in M6 and M5 (blocks 405,414e and 1008 of FIGS. 10, 10c).

With each character of the phrase introduced, the content of M5 is brought up to date so as to hold the address of the cell in buffer 160 in which the last character digitized is stored or the last space added by the machine for the purpose of governing the proportional spacing. Analogously, the content of M6 will be brought up to data after each fresh digitizing operation so that it holds at any particular moment, the address of the cell in buffer 160 which stores the first character of the phrase under blind conditions. Furthermore the content of M4 is 0 at the start of imposition in the blind state and will be up-dated in order to represent the total spacing associated with each character digitized blind (i.e. the width of the part of the title or of the phrase already digitized in the case of alignment at the right hand side, or the half way point in the case of true and real centering.

Upon digitizing each character, (point PUNT, FIG. 6), the program stores the code of the character in CO- TAST(block 202b) and checks to see if this does concern a character (branch 206a, output 0 of FIG. 6A): it then checks the heavy print, underlined, space or dead key conditions, (branches 207, 207b-f, 208,212a,271). Now supposing that all the characters in the phrase to be centered are "live" and are lacking in other conditions, the program now stores the spacing selected and associated with the character in C1 (block 210, 212c).

After further control operations, which do not have an influence in the case being examined (branches 213 and 213a) it jumps, via outputs 1 from branches 213b-d and 214, to point D, from which the spacing is corrected in the case of proportional writing (DVPS=1). If the character introduced has a spacing which is greater than 5/60" this brings about the introduction of a unitary space into the cell of buffer 160 to the right of the cell which will store the code of the character digitized, and the corresponding reduction by one unitary space in the spacing of this character (branch 219a output and block 219b for introduction of a space from point W of FIG. 6B blocks 220, 221 and block 233a-235, and block 224). The two spaces are preserved in C1 and C2. This space addition does not occur, on the other hand, if DV3=0, i.e. in the case of alignment at the right hand margin.

The program consequently jumps via the non-influential branches 225, 240, output 0 and 243 output 1, to the up-dating of CONTA with the spacing of the character (blocks 227 and 243); consequently, via branch 244 (DVSC=1) and point PGA (FIG. 7), the whole spacing of the character (block 450) is stored in C1 and C3. When the centering condition is recognised (branch 451, 458 DVIRG=DVCT=1) it jumps in order to check if the value of CONTA is greater than or equal to the field available for centering (M3) (branch 474). Since this condition is certainly checked for the first imposition under blind conditions, the program jumps (branch 475) to point SC4 for true and proper centering (DV3=0) or to point SC9 for alignment on the right hand margin (DV3=1).

From point SC4, the program stores in buffer 160, at the address defined by CRIGA and for the first imposition under blind writing conditions, the code of the character digitized whilst preserving in C2 and in S4 the spacing of the preexisting code in the cell (blocks 468-470 FIG. 7).

Figure 7A:
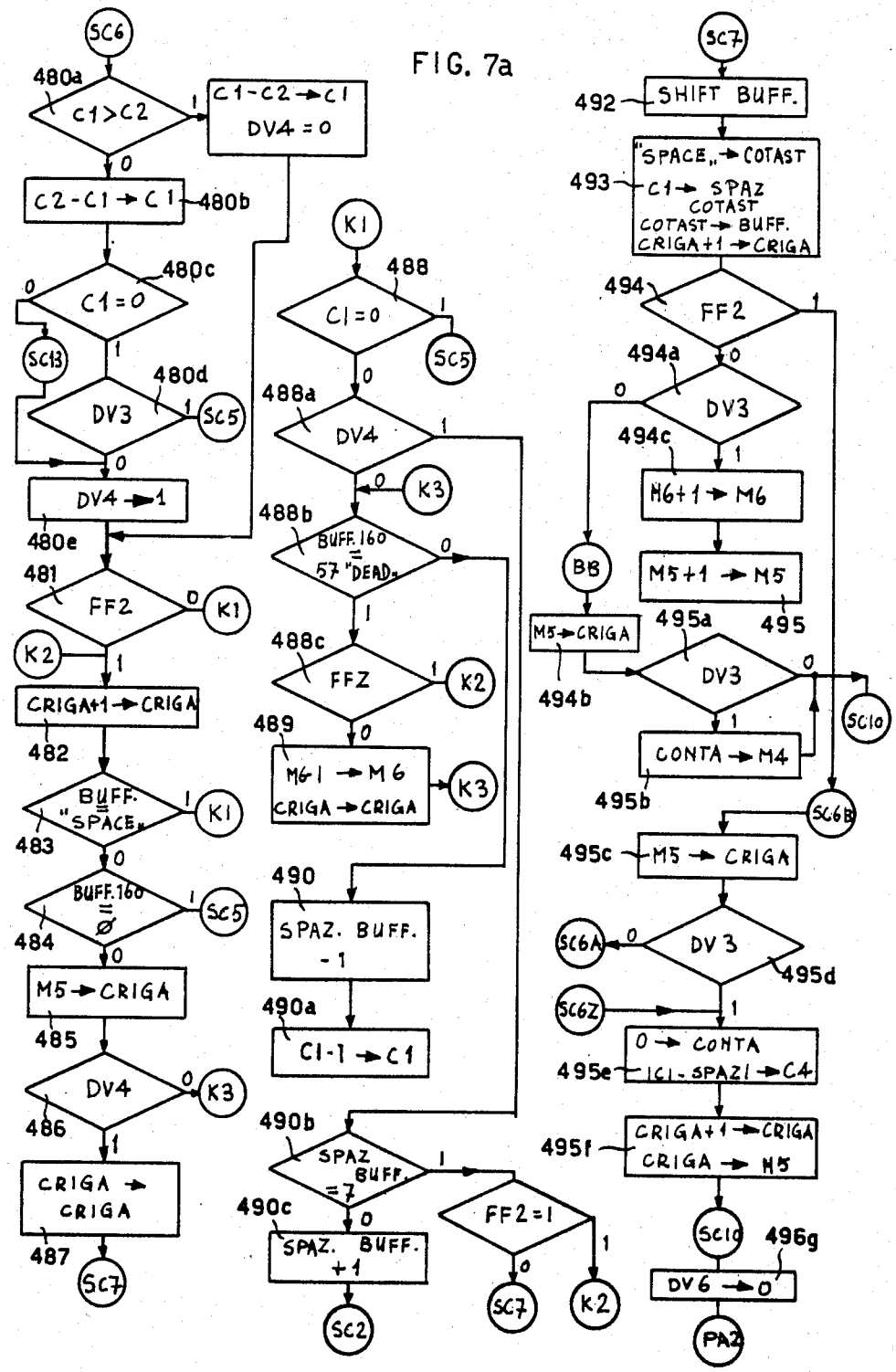

Then, from point SC6 (FIG. 7A), the program checks to see if the spacing C1 associated with the character digitized is or is not equal to the spacing previously stored (C2) (branch 480a and 480c). If the codes are the same or the following cell to the right is empty (branch 434 output 1) it jumps to point SC6-A, whilst, on the other hand, if it is greater or less it carries out an adjusting routine of the spacing which consists of increasing (with C2>C1 and DV4=1) or, respectively, decreasing (with C1>C2 and DV4=0) the spacing of one or more consecutive space codes up to the point where the difference is made good. These spaces are the ones which are stored in one or more adjacent cells of buffer 160, immediately to the right of the cell (branches of FIG. 7A from point K1 and from point SC7 with FF2=1) of the character stored. When this adjustment is completed, the program jumps to SC6 A.

This adjustment operation for the spacing makes it possible to maintain storage in buffer 160 of the line of writing in such a way as to allow, at any instant, the repositioning of the print head exactly on one predetermined point of the line by simply operating the spacer bar or the back space key and obtaining spacings which are equal to those of the various characters.

From point SC6 A, since the first imposition in the blind state is now concerned (DV6=1), the program jumps to point SC6 Z, where C4 is caused to store the possible difference between the real spacing of the character due to selector 82, this spacing being stored in cell SPA2, and that resulting from the previously carried out correction (this difference is at the most=1) and then jumps in order to wait for the imposition of a new character after having carried out an addition to M5 and CRIGA and reset DV6 (blocks 495e-g). Following the branch for alignment at the right hand side from point FC9 (FIG. 7), the program stores the code for the character digitized in the cell adjacent at the left hand side to the one which was initially "directed at" by CRIGA, (blocks 477 and 478) up-dates M6 (block 477) and carries out a check between the spacing (C1) of the character which has just been stored in the buffer and that of the character previously stored in the same cell, operating in an identical manner to what has been described above. Should there be a difference, it increases or decreases the possible character codes stored in adjacent consecutive cells to the left of the cell for the character digitized or spacing codes are inserted until the difference is made good (FIG. 7A branches SC6,K1 and SC7 with FF2=0 and DV3=1) then it up-dates MS, CRIGA and M4 with the value from CONTA (block 495) and jumps in order to await the digitising of a fresh character.

Digitizing of the following characters causes the program to carry out the steps described above with reference to the first character (when applicable) up to point SC6 A (FIG. 7B) for centering with respect to the margins or with respect to the points selected by the operator. From point SC6 A, DV6 now being 0, the program divides the spacing of the character digitized by two "by defect" plus possible remainders from the preceding operations stored in C4 (block 432, 435) and accumulates this quotient in M4. Then it carries out a check of the spacing in the cell of buffer 160 immediately to the left of the cell containing the first character of the phrase under blind conditions. In order to achieve this, it deducts the value of this quotient from the spacing associated with the space code (blocks 435-438) and cancels out this space using a shift operation to the left in the buffer (loop from point SC9 to SC11 with output at JR, from J with FF2=0 and from here, possibly via point SC13, and is an output to SC10 after up-dating of M6, M5 and CRIGA).

In this way, after the introduction of each character (with the exception of the first), the phrase to be centered which is already stored in the buffer shifts to the left of the middle the spacing associated with the character last digitised and stored, thus ensuring centering on the point intended.

In an analogous manner, when carrying out alignment at the right hand side, the above described operations are repeated relating to introducing the first character, accumulating in M4 the total value of the spacings of the characters which have entered and by reducing and eliminating the spacing associated with the spaces to the left of the cell containing the first character of the phrase to be aligned. This reduction is equal to the spacing associated with each character which has entered, so that the phrase already stored in buffer 160 is shifted progressively towards the left so as to constantly align the phrase at the right hand margin.

PRINT OF THE CENTERED OR ALIGNED PHRASE

This is obtained by operating one of the service keys S. The governing program for these keys jumps to point NLSC (FIG. 9) and causes (branch 300b output 0, branch 305=1):

(a) in the case of centering with respect to the margins (branch 305=1) advance of the print head from the left hand margin through a distance which is equal to the distance between half the line of writing (M3) and half of the overall spacing associated with the phrase to be centered (M4) (blocks 306 and 307);

(b) in the case of centering with respect to one point selected by the operator, and also with alignment at the right hand side, the moving back of the print head from the point selected to be the center and, respectively, from the right hand margin through a distance which is equal to half or, respectively, the whole of the overall spacing associated with the phrase to be centered or to be aligned (M4) (block 305a output 0 and blocks 310 and 311).

Following this, and in both cases, print is carried out from the buffer of the phrase to be aligned or to centered starting from the first character stored in M6 up to the last value of CRIGA (corresponding to that of M5) (blocks 308 and 303 FIG. 11).

We claim:

1. In an electronic typewriter comprising a keyboard having alphanumeric keys for entering characters of words and space means for entering spaces between said words and a print unit for printing the entered characters, the combination comprising: justification selecting means of the keyboard actuatable between an inoperative state and an operative state, means for defining in sequence each printing point of the entered characters along a printing line, end margin positioning means for storing the position of an end margin of the printing line, means for fixing an editing region on the printing line wherein the entered characters should be edited to have the last character of the printing line justified with respect to the end margin of the printing line, means for confronting the printing point of the entered characters defined by said defining means with respect to said region, a line store for sequentially storing the printing points of the printing line and associated characters to be printed in said printing points, means responsive to the operative state of said justification selecting means and to said confronting means for causing the print unit to print immediately in sequence the entered characters on said printing points whether said points are external to the editing region and for storing without printing said entered characters in said line store whether the defined printing points are internal to said editing region, means responsive to said confronting means and to the entered characters to complete printing of all characters of a last word, even in the case when part of said characters of the last word are internal to the editing region and to actuate storage without print only after a space adjacent to the last word has been entered by said space means, means for modifying the printing points of stored and not printed characters along the printing line and service keys actuatable to cause the print unit to print in sequence said stored and not printed characters on the modified printing points of said editing region to obtain the last character of the printing line correctly justified with respect to the end margin of the printing line.

2. Typewriter according to claim 1, wherein said means for modifying the printing points comprise means for calculating the number of engaged elementary spaces necessary for the printing of the stored and not printed characters internal to said editing region and the number of available elementary spaces included in said editing region and means which can be activated by the said means for calculation when the engaged number is less than the available number, in order to store in the said line store as many elementary spaces, besides the individual spaces between words internal to said editing region of the line, as are necessary for justification of the last character at the end margin of the said printing line.

3. An electronic typewriter according to claim 1 further comprising means to switch the typewriter between an OFF condition a non-volatile store having locations wherein information for positioning the print unit along said printing line is permanently stored in the ON and OFF conditions of the typewriter wherein said information include said end margin, storing key means to selectively address said locations and permanently store therein said end margin, and means responsive to the switching of the typewriter from the OFF to the ON condition and to its read mode for causing the print unit to print the entering characters along the printing line according to the information for positioning stored in the locations of said non-volatile store in the ON condition of the typewriter immediately preceding the OFF condition.

4. A typewriter according to claim 3, wherein the said information for positioning comprises the position of the beginning margin of the printing line.

5. Electronic typewriter comprising a keyboard for imposing characters, including character key means actuatable to generate character selecting codes and a spacing member manually positionable either in a differentiated spacing position or in constant spacing positions; spacing code generating means for generating a spacing code associated with said imposed character, wherein said spacing code depends on the width of the imposed character on the differentiated spacing position of said spacing member and wherein said spacing code depends only on the position of said spacing member on the constant spacing positions of said spacing member; a print unit responsive to the character selecting code for writing the imposed character on an associated point of writing of a sheet and means responsive to the spacing code of each written character for displacing the point of writing through differentiated spacing steps dependent on the spacing code of said written character, characterized by a memory having a plurality of stores wherein each store is adapted to store the character selecting code and the spacing code of an associated written character, by a device for deleting characters written from the sheet of the type actuating the print unit to reprint the characters written, through a deleting ribbon, by positioning means actuatable to address the store of an adjacently written character and respond to the spacing code of said adjacently written character to exactly and automatically position the print unit in front of a character to be deleted, independently of the actual position of said spacing member, wherein said deleting means comprise means, recalling from the store of the character to be deleted the selecting code of said character to be deleted for causing said print unit to reprint said character to be deleted through said deleting ribbon and by store cancel means which cancel out from the store the selecting codes of the characters which have been deleted from the sheet, leaving in their place space selecting codes replaceable by the character selecting codes of correct characters and having the same spacing and by means which, after deletion, provide a prearranged state in the print unit, and displace codes of the characters deleted from the sheet.

6. An electronic typewriter comprising a keyboard having alphanumeric keys actuatable for entering characters to be printed and having a heavy print selecting member, a serial print unit movable along a plurality of printing points of a printing line of a sheet, print control means causing said print unit to print the entered character on its printing point of the sheet, wherein said print control means respond to the code of each actuated alphanumeric key and to an actuated position of said heavy print selecting member to cause the print unit to print the entered character on its printing point and to repeat the print of said entered character after the print unit has been displaced through a predetermined small distance with respect to its printing point in order to give the appearance of heavy print, code generating means responsive to actuation of one of said alphanumeric keys for generating a character code associated with said actuated alphanumeric key, wherein said code generating means respond to actuated position of said heavy print selecting member for generating a heavy print code associated with said character code, a line store having cells associated with said printing points for storing therein character codes and the associated heavy print code for moving the print unit along the printing line and in front of the printing points of the already written characters, means responsive to the printing point of the print unit for addressing in sequence an associated cell of said cells, and a deleting device for deleting from the sheet characters already written using reprinting in a deleting mode of the characters written, wherein said deleting device comprises means which identify the cell of the character written to be deleted and which recall from the line store the code of said characters written, means responsive to the character code of said characters to reprint them in a deleting mode and means responsive to the heavy print code associated with said code of character for repeating the reprint of said characters in the delete mode after the print unit has been displaced substantially said predetermined distance with respect to the first reprint in order to completely delete the character written through said heavy print mode.

* * * * *